United States Patent
Uehara

(10) Patent No.: US 6,816,228 B2
(45) Date of Patent: Nov. 9, 2004

(54) ELECTRO-OPTICAL DEVICE, INSPECTION METHOD THEREOF, AND ELECTRONIC EQUIPMENT

(75) Inventor: Hideki Uehara, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/771,209

(22) Filed: Feb. 2, 2004

(65) Prior Publication Data

US 2004/0156006 A1 Aug. 12, 2004

Related U.S. Application Data

(62) Division of application No. 10/001,249, filed on Oct. 31, 2001, now Pat. No. 6,760,091.

(30) Foreign Application Priority Data

Oct. 31, 2000 (JP) ........................................ 2000-333935
Aug. 23, 2001 (JP) ........................................ 2001-253470

(51) Int. Cl.$^7$ .............................................. G02F 1/13
(52) U.S. Cl. ....................................................... 349/192
(58) Field of Search ......................................... 349/192

(56) References Cited

U.S. PATENT DOCUMENTS

| 4,985,663 | A | | 1/1991 | Nakatani .................. 315/169.3 |
| 5,499,131 | A | * | 3/1996 | Kim ............................. 349/149 |
| 5,982,470 | A | | 11/1999 | Nakahara et al. ........... 349/153 |
| 5,986,739 | A | | 11/1999 | Kobayashi |
| 6,052,170 | A | * | 4/2000 | Kobayashi .................. 349/149 |
| 6,281,959 | B1 | | 8/2001 | Kim et al. .................. 349/152 |
| 6,469,767 | B2 | | 10/2002 | Onishi ........................ 349/149 |

FOREIGN PATENT DOCUMENTS

| JP | 02-208634 | 8/1990 |
| JP | 11-352505 | 12/1999 |
| KR | 1997-66681 | 10/1997 |

OTHER PUBLICATIONS

Communication from Korean Patent Office regarding counterpart application.
Communication from Chinese Patent Office regarding counterpart application.
Communication from Japanese Patent Office regarding counterpart application.

* cited by examiner

Primary Examiner—James A. Dudek
(74) Attorney, Agent, or Firm—Harness, Dickey & Pierce, P.L.C.

(57) ABSTRACT

A liquid crystal apparatus is provided with a substrate holding an electro-optical material, and a plurality of wires that have routing wire portions formed in a region of the substrate other than a region opposing the electro-optical material. The routing wire portion of each of the wires has a first portion and a second portion that is narrower than the first portion. In an inspection process of the liquid crystal apparatus having such a configuration, a plurality of inspection terminals for supplying predetermined drive signals to the wires are brought into contact with the second portions of the wires.

4 Claims, 20 Drawing Sheets

FIG. 14
(f)
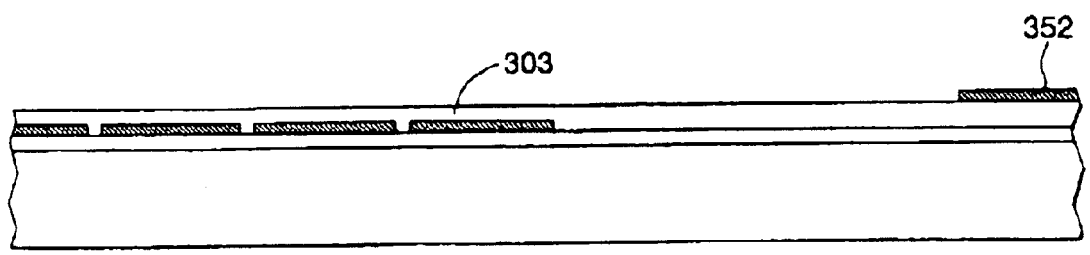
(g)
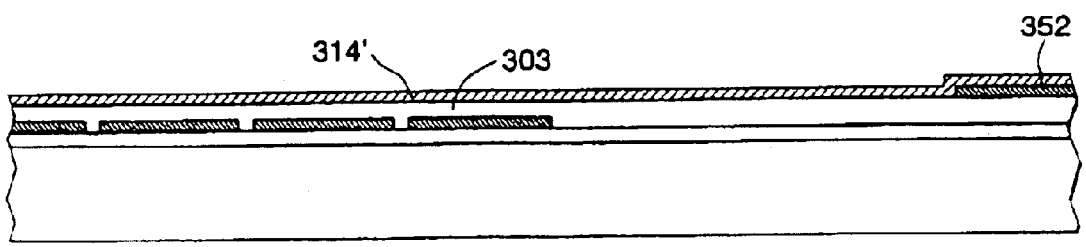
(h)
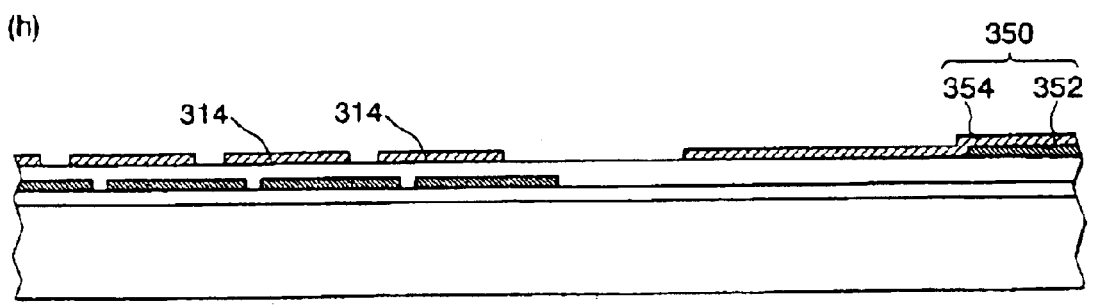
(i)
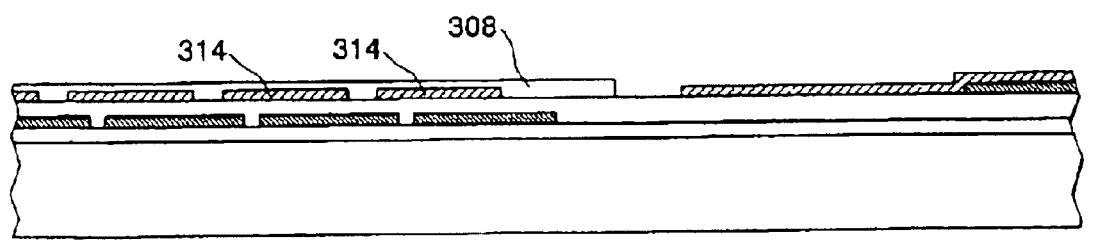

ELECTRO-OPTICAL DEVICE, INSPECTION METHOD THEREOF, AND ELECTRONIC EQUIPMENT

CROSS REFERENCE TO RELATED APPLICATION

This application is a divisional patent application of U.S. Ser. No. 10/001,249 filed Oct. 31, 2001 now U.S. Pat. No. 6,760,091, claiming priority to Japanese Patent Application Nos. 2000-333935 filed Oct. 31, 2000 and 2001-253470 filed Aug. 23, 2001, all of which are hereby incorporated by reference.

BACKGROUND OF THE INVENTION

1. Technical Field of the Invention

The present invention relates to an electro-optical device, an inspection method for the same, and electronic equipment.

2. Description of the Related Art

As is well known, liquid crystal apparatuses are extensively used as the display units in a variety of electronic equipment, such as cellular telephones. Such a liquid crystal apparatus has a pair of substrates attached to each other through the intermediary of a sealing member, liquid crystal supported between the two substrates, and a plurality of electrodes for applying a voltage to the liquid crystal. More specifically, in a typical configuration, a drive signal output from a driver IC mounted on a substrate or a flexible substrate or the like is supplied to each electrode via wires formed on the substrate.

In a process for manufacturing such a liquid crystal apparatus, a so-called lighting inspection is generally performed. In the lighting inspection, it is determined whether all pixels normally light. To perform the lighting inspection, first, a plurality of inspection terminals provided on an inspection apparatus are brought into contact with the wires formed on a substrate. Then, predetermined drive signals are supplied from the inspection terminals to a plurality of electrodes via the wires. And an image displayed as a result is observed visually or by a CCD (Charge Coupled Device) camera so as to determine whether all pixels normally light.

However, in the case that the intervals among the wires formed on the substrate are small, it is extremely difficult to accurately bring respective inspection terminals into contact with desired wires. More specifically, in the case that the interval between adjoining wires is small, it is difficult to have one inspection terminal in contact only with a single wire. This results in undesirable contact of the inspection terminal with two adjoining wires, thereby preventing accurate inspection from being accomplished.

Furthermore, increasing the number of electrodes to achieve a higher display definition automatically requires more wires. In this case, it is necessary to reduce an interval between adjoining wires on a substrate. Accordingly, the problem described above becomes more marked. When COG (Chip On Glass) technology is used to mount a driver IC on a substrate, the wires on a projecting region must be concentrated in a region where the driver IC is to be mounted, and the intervals among the wires are reduced in the vicinity of the region. Hence, the problem described above exists in this case also. These problems will arise also in another electro-optical device, such as an EL apparatus employing an EL (Electro-Luminescence) layer as its electro-optical material.

The present invention has been made in view of the situations described above, and it is a feature of the present invention to provide an inspection method for an electro-optical device that permits accurate inspection even in the case that intervals among wires formed on a substrate are small, an electro-optical device for which the inspection method is used, and electronic equipment employing the electro-optical device.

SUMMARY OF THE INVENTION

To solve the problems described above, an electro-optical device in accordance with the present invention is equipped with a substrate holding an electro-optical material, and a plurality of wires that have routing wire portions formed in a region other than a region opposing the electro-optical material in the substrate, wherein a routing wire portion of each of the wires has a first portion and a second portion that has a width smaller than that of the first portion. In other words, the routing wire portion of each of the wires has the first portion and the second portion, and the intervals between adjoining routing wire portions at the second portions are larger than the intervals at the first portions.

Generally, in the inspection process for an electro-optical device, it is necessary to have inspection terminals in contact with wires exposed on a substrate (i.e., the routing wire portions). However, if the intervals among the wires are extremely small, there may be an inconvenience, for example, in that one inspection terminal undesirably comes in contact with two wires, making it difficult to accomplish accurate inspection. According to the electro-optical device in accordance with the present invention, the width of the second portion in the routing wire portion is smaller than the width of the first portion. In other words, the interval between adjoining wires at the second portions is larger than the interval at the first portions. Hence, by bringing the inspection terminal into contact with the second portion, it will be possible to avoid a situation that the inspection terminal contacts another wire even in the case that the inspection terminal to be in contact only with one of the wires is slightly shifted. Therefore, according to the present invention, even in the case that the intervals among the wires formed on the substrate (to be more accurate, the intervals at the first portions) are extremely small, the inspection using the inspection terminals can be accurately performed.

To implement such an action, it is alternatively conceivable, for example, to reduce the width of the entire routing wire portion. However, this configuration would cause a problem of an increased wire resistance or a problem in that the wires are easily broken. According to the present invention, the width of only a part (the second portion) of the routing wire portion is reduced, thus reducing the occurrence of the above problems.

The electro-optical device described above is preferably provided with a driver IC that is mounted in a region other than a region opposing the electro-optical material in the substrate and that supplies output signals to the wires. Thus, in the case that the driver IC is mounted on a substrate by using the COG technology, many wires must be concentrated in the region where the driver IC is mounted, thereby making it necessary to reduce the intervals among the wires. Therefore, a particularly marked advantage can be obtained by applying the present invention, which realizes accurate inspection even when the intervals among wires are small, to an electro-optical device with a driver IC mounted on a substrate thereof.

Also desirable is a configuration in which pixels constructed by a plurality of sub-pixels respectively corresponding to different colors and color filters of the colors corresponding to the respective sub-pixels are provided. In an electro-optical device that enables full-color display, a plurality of sub-pixels corresponding to different colors make up one pixel. Hence, the electro-optical device that enables full-color display has more wires than a monochromic display electro-optical device that has the same number of pixels, so that the intervals among the wires need to be reduced. However, the present invention enables accurate inspection even in the case that the intervals among the wires are small as mentioned above.

In an electro-optical device equipped with a plurality of first electrodes and a plurality of second electrodes that are located on the other side of the first electrodes, sandwiching the electro-optical material therebetween and that extend in a direction for intersecting with the first electrodes, the wires may connect to either the first electrodes or the second electrodes, whichever have more electrodes. In other words, usually, wires connecting to many electrodes make it difficult to accomplish accurate inspection because of their small intervals. However, providing the wires with the first portions and the second portions allows accurate inspection to be implemented.

In the electro-optical device according to the present invention, preferably, the wire has a first layer and a second layer that has a resistance value lower than that of the first layer, and the second layer is formed to correspond at least to the second portion in the wire. In the case that the width of the second portion is set smaller than that of the first portion, the resistance value in the second portion will be conceivably higher. However, constructing the second portion from the first layer and the second layer that has a lower resistance value than the first layer makes it possible to control a rise in the resistance value attributable to a smaller width. To be more specific, it is conceivable to form the first layer from a metal oxide film and to form the second layer from a metal film. Furthermore, in an electro-optical device equipped with an electrode that is formed on the substrate and applies a voltage to the electro-optical material, it is desirable to form the first layer made of the metal oxide film by using the same layer as the electrode. This makes it possible to simplify the manufacturing process and reduce manufacturing cost, as compared with a case that the first layer and the electrode are formed in separate steps.

When a wire having a first layer and a second layer is adopted, it is preferable to avoid for forming the second layer the portion where the wire and the driver IC are connected. In the case that the second layer is formed from, for example, silver or an alloy containing silver as a primary component, a problem may arise in that the second layer easily comes off the substrate when subjected to an external force. However, by avoiding for forming the second layer the portion where the wire and the driver IC are connected, it will be possible to prevent a force from the driver IC from affecting the second layer, thereby making it possible to prevent the second layer from coming off the substrate.

It is also preferable to substantially align the second portions for the plurality of wires. This is advantageous in that a plurality of inspection terminals to be brought into contact with the second portions of the individual electrodes are arranged substantially in a row in an inspecting apparatus used for the lighting inspection, thus achieving a simpler configuration.

The present invention can be applied to a liquid crystal apparatus having liquid crystal, which is the electro-optical material, supported between the substrate and another substrate attached to each other through the intermediary of a sealing member. In the electro-optical device to which the present invention is applied, in the case that the wire is formed to have a first layer and a second layer having a resistance value lower than that of the first layer, it is desirable to form the second layer so as to correspond to at least the second portion in the wire and to avoid the region where the scaling member is formed in the substrate. This makes it possible to control a rise in the resistance value caused by reducing the width of the wire at the second portion. Moreover, in the case that the second layer is formed of, for example, a silver alloy, a problem may arise in that the second layer easily comes off a substrate. However, by avoiding for forming the second layer the region, where the sealing member has been formed, , it will be possible to prevent a force from the sealing member from affecting the second layer, thus making it possible to prevent the second layer from coming off the substrate.

The present invention can be applied also to a variety of electro-optical devices, such as an EL apparatus employing an EL luminescent layer as the electro-optical material, in addition to liquid crystal apparatuses.

Furthermore, to solve the problems, electronic equipment in accordance with the present invention is provided with the electro-optical device described above as a display unit. As described above, the electro-optical device in accordance with the present invention allows accurate lighting inspection even in the case of the small intervals among wires, so that the possibility of the electro-optical device incurring display failure can be reduced in the electronic equipment incorporating the electro-optical device. The advantages provided by the present invention will be particularly marked in a configuration wherein a driver IC is mounted on a substrate or a configuration wherein the second portions are substantially aligned for a plurality of wires.

Furthermore, to solve the problems described above, there is provided an inspection method for an electro-optical device equipped with a substrate holding an electro-optical material, and a plurality of wires that have routing wire portions formed in a region other than the region opposing the electro-optical material in the substrate, wherein the routing wire portion of each of the wires has a first portion and a second portion having a width smaller than that of the first portion, the inspection method including a step for bringing an inspection terminal into contact with the second portion of the routing wire portion in each of the wires, a step for supplying a predetermined drive signal to the wire via the inspection terminal, and a step for determining whether the electro-optical device is good or bad on the basis of an image displayed by supplying the drive signal.

In an electro-optical device to which the inspection method is applied, even in the case that the intervals among wires have to be made extremely small, relatively large intervals can be secured among the wires at the second portions. Therefore, even when the inspection terminal brought into contact with each wire is slightly shifted from the wire to contact with, it will be possible to avoid a situation where the inspection terminal contacts another adjacent wire. Therefore, even in the case of the extremely small intervals among wires, accurate inspection can be performed.

In the step for bringing an inspection terminal into contact with the routing wire portion in the inspection method, it is desirable to bring the plurality of inspection terminals into contact with the second portions of the wires at a time. This makes it possible to determine the presence of disconnection or short circuit in many wires at the same time, permitting highly efficient inspection to be performed. In the step for bringing the inspection terminals into contact with the routing wire portions, it is desirable to abut the inspection terminals substantially shaped like flat plates against the wires to flex the inspection terminals thereby to cause the inspection terminals and the wires to be in surface contact with each other. Bringing the inspection terminals and the second portions into surface contact in this manner allows predetermined drive signals to be securely applied to the wires, further improving inspection accuracy to be achieved.

BRIEF DESCRIPTION OF THE DRAWINGS

FIGS. 14 (*f*) through (*i*) are sectional views showing process steps for manufacturing the rear-side substrate in the liquid crystal panel.

DETAILED DESCRIPTION OF THE PREFERRED EMBODIMENTS

Figure 1:
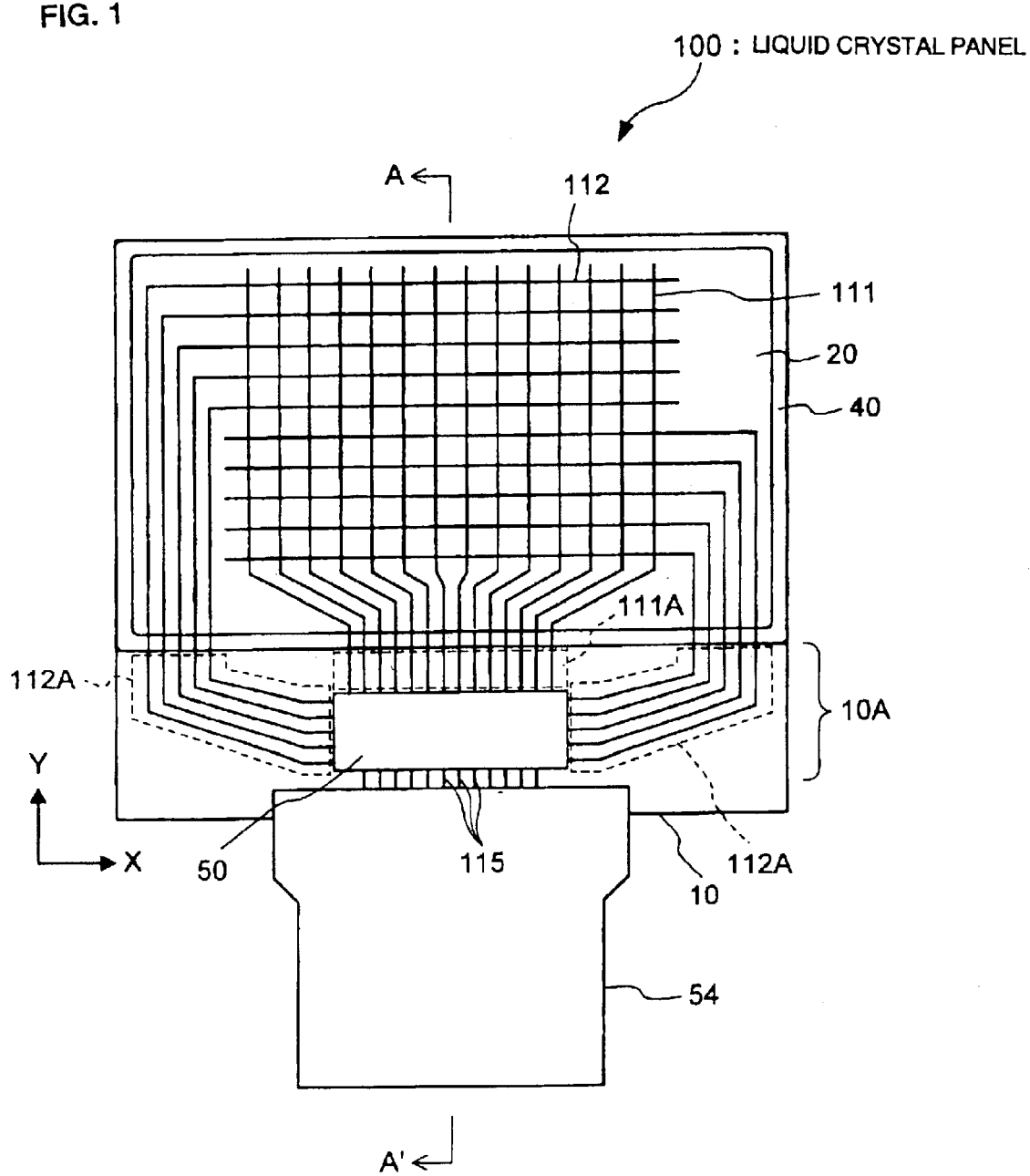
FIG. 1 is a top plan view showing general configuration of a liquid crystal apparatus according to a first embodiment of the present invention.

The embodiments of the present invention will now be described with reference to the drawings. The embodiments represent some modes of the present invention, and should not limit the present invention. Arbitrary modifications may be made within the scope of the present invention. In the drawings to be shown below, layers and members are not drawn to scale in order to show the layers and members in recognizable sizes in the drawings.

First, as an electro-optical device in accordance with the present invention, a liquid crystal apparatus employing liquid crystal as an electro-optical material will be illustrated. This embodiment illustrates a so-called transmissive type liquid crystal apparatus in which light incident from a rear side is admitted to an observing side so as to perform display. This, however, should not be considered to restrict the scope of application of the present invention thereto.

Figure 2:
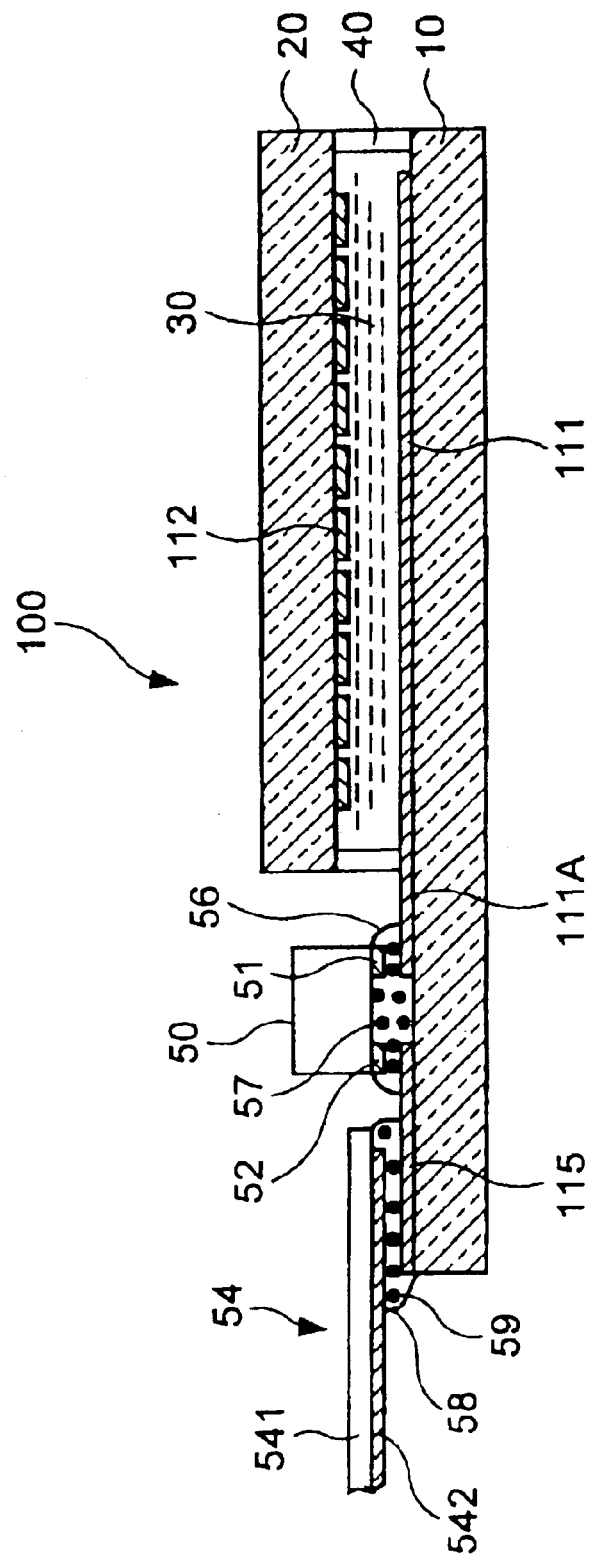
FIG. 2 is a sectional view taken at the line A–A' in FIG. 1.

FIG. 1 is a perspective view showing an entire configuration of a liquid crystal panel of a liquid crystal apparatus according to an embodiment of the present invention. FIG. 2 is a view showing a part of the section observed from a line A–A' in FIG. 1. As shown in these drawings, a liquid crystal panel 100 is configured such that liquid crystal 30 is sealed in between a rear-side substrate 10 and an observing-side substrate 20 that are attached to each other through the intermediary of a frame-shaped sealing member 40. The rear-side substrate 10 has a region 10A projecting from the observing-side substrate 20 (i.e., the region not opposing the observing-side substrate 20. The region will be hereinafter referred to as "the projecting region"). In the projecting region 10A, a driver IC 50 for driving the liquid crystal panel 100 is mounted by using COG technology. Furthermore, an FPC (Flexible Printed Circuit) board 54 is joined to an area in the vicinity of an edge of the projecting region 10A. A backlight unit will actually be disposed at the rear side of the liquid crystal panel 100. However, it will not be illustrated and explained because it is not directly related to the present invention. In this configuration, the light emitted by the backlight unit is transmitted through the rear-side substrate 10, the liquid crystal 30, and the observing-side substrate 20 to be visually recognized by an observer.

On the inner surface (adjacent to the liquid crystal 30) of the rear-side substrate 10, a plurality of segment electrodes 111 extending in a direction Y shown in FIG. 1 are formed. The segment electrodes 111 are formed from a transparent conductive material, such as ITO (Indium Tin Oxide). Although in FIG. 1, the segment electrodes 111 are illustrated as a single straight line to prevent the drawing from becoming complicated, the actual segment electrodes 111 are a band-shaped electrode assembly having a predetermined width (the same for a common electrode 112, which will be discussed hereinafter).

The segment electrodes 111 are formed on the rear-side substrate 10 such that they extend from the region (the region in the sealing frame) opposing the observing-side substrate 20 to the projecting region 10A. To be more specific, the segment electrodes 111 are drawn out of the frame of the sealing member 40, and extended toward the region wherein the driver IC 50 is mounted. Hereinafter, the portion of the segment electrodes 111 that is formed in the projecting region 10A will be denoted as a "routing wire portion 111A", as shown in FIG. 1. One end of the routing wire portion 111A is connected to an output bump (projecting electrode) 51 of the driver IC 50. More specifically, as shown in FIG. 2, in a state wherein the driver IC 50 is joined onto the rear-side substrate 10 through the intermediary of an adhesive agent 56, the output bump 51 formed on the output terminal of the driver IC 50 and the end of the routing wire portion 111A are brought into conduction through the intermediary of conductive particles 57 dispersed in the adhesive agent 56.

In the region of the inner surface of the observing-side substrate 20, which region opposes the rear-side substrate 10, a plurality of common electrodes 112 are formed that extend in a direction orthogonal to the segment electrodes 111 (i.e., in a direction X shown in FIG. 1). Each of the common electrodes 112 is a band-shaped electrode formed from a transparent conductive material, such as ITO, and formed to reach the vicinity of a peripheral edge in contact with the projecting region 10A in the observing-side substrate 20. The portion reaching the vicinity of the peripheral edge is electrically connected with routing wire portions 112A formed on the rear-side substrate 10, through an anisotropic conductive film (not shown in the drawing) installed between the rear-side substrate 10 and the observing-side substrate 20. The routing wire portions 112A are formed of the same layer as that of the segment electrodes 111 (and the routing wire portions 111A) on the rear-side substrate 10. Each of the routing wire portions 112A extends to reach the region where the driver IC 50 is to be mounted, and the ends thereof are connected to output bumps 51 of the driver IC 50. Specifically, as in the case of the routing wire portions 111A, the ends of the routing wire portions 112A connect to the output bump 51 of the driver IC 50 through the conductive particles 57 in the adhesive agent 56.

Practically, the surface of the rear-side substrate 10 on which the segment electrodes 111 are formed and the surface of the observing-side substrate 20 on which the common electrodes 112 are formed are covered with alignment layers rubbed in a predetermined direction, which are not shown in the drawing. Furthermore, the outer surfaces of the rear-side substrate 10 and the observing substrate 20 are provided with polarizers or retardation films attached thereto, which are not shown either in the drawing.

Figure 3:
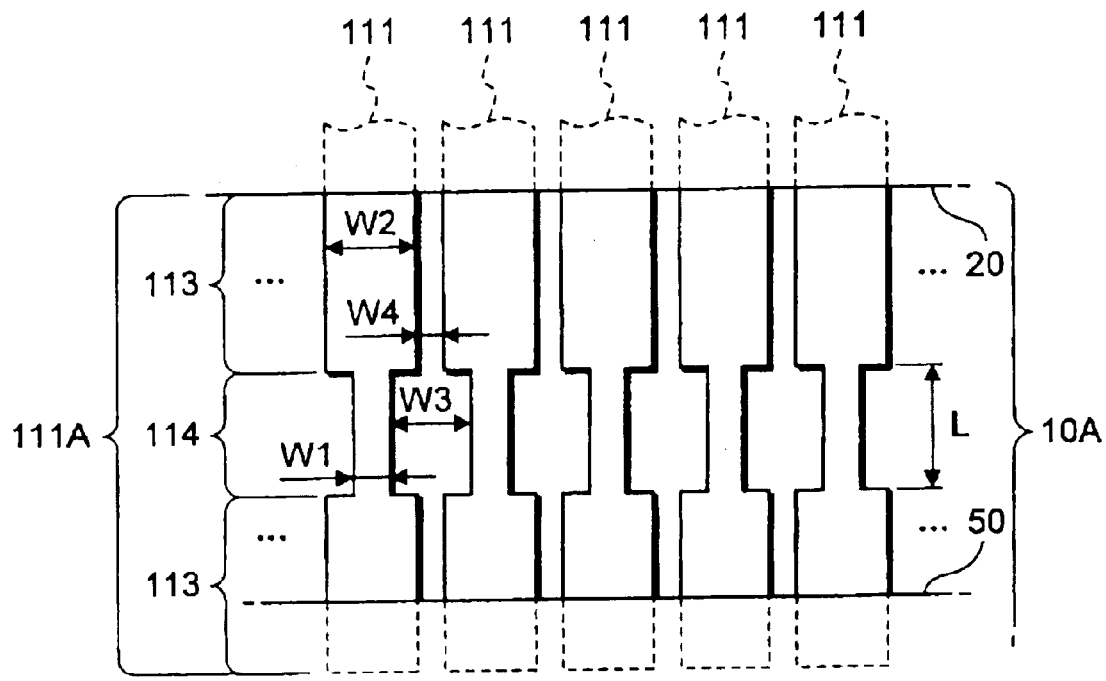
FIG. 3 is a top plan view showing an enlarged view of a routing wire portion of the liquid crystal apparatus.

FIG. 3 is a top plan view showing an enlarged view of the shape of the routing wire portions 111A formed in the projecting region 10A. As shown in the drawing, each of the routing wire portions 111A has first portions 113 including both ends of the routing wire portion 111A and a second portion 114 positioned in the vicinity of the center of the routing wire portion 111A in the extending direction (i.e., both ends are sandwiched by the first portions 113). A width W1 of the second portion 114 is smaller than a width W2 of the first portions 113. For example, the width WI is approximately 23 $\mu$m, and the width W2 is approximately 34 $\mu$m. In other words, an interval W3 between the second portions 114 in the adjoining routing wire portions 111A is set to be larger than an interval W4 between the first portions 113. For instance, the interval W3 is approximately 28 $\mu$m, and the interval W4 is approximately 16 $\mu$m. Furthermore, in this embodiment, the second portions 114 of the routing wire portions 111A are substantially aligned over the plurality of the routing wire portions 111A, as shown in FIG. 3. Namely, the second portions 114 are formed substantially at the same position in the direction in which the routing wire portions 111A extend.

The configuration of the routing wire portions 111A has been described. The routing wire portions 112A connected to the common electrodes 112 have the same configuration as that of the routing wire sections 111A. More specifically, the routing wire portions 112A also have the first portions 113 and the second portions 114, and the second portions 114 have widths smaller than those of the first portions 113. In addition, the second portions 114 of the routing wire portions 111A and the second portions 114 of the routing wire portions 112A are arranged so that they are substantially aligned. In the following descriptions, the routing wire portions 111A continuing to the segment electrodes 111 and the routing wire portions 112A connected to the common electrodes 112 will be referred to simply as "routing wire portions 11" unless it is particularly necessary to discriminate them.

As shown in FIG. 1 and FIG. 2, wires 115 are formed in the projecting region 10A such that they extend from a peripheral edge of the projecting region 10A to the region where the driver IC 50 is mounted. As shown in FIG. 2, one end of each of the wires 115 is connected to an input bump 52 formed on an input terminal of the driver IC 50 through the intermediary of the conductive particles 57 in the adhesive agent 56.

An FPC board 54 has a base member 541 and a plurality of wires 542. The base member 541 is a film-type member formed of polyimide, for example. The wires 542 serve to supply signals output from an external unit, not shown in the drawing, to the input terminal of the driver IC 50, and are formed on the surface of the base member 541. As shown in FIG. 2, the base member 541 of the FPC board 54 is joined to the rear-side substrate 10 through the intermediary of an adhesive agent 58. The wires 542 on the base member 541 connect to the wires 115 on the rear-side substrate 10 through the intermediary of conductive particles 59 dispersed in the adhesive agent 58.

In the aforesaid configuration, upon receipt of various signals (e.g., clock signals,) related to a display image from external equipment through the intermediary of the FPC board 54 and the wires 115, the driver IC 50 generates drive signals based on the received signals. The drive signals are applied to the segment electrodes 111 and the common electrodes 112, respectively, through the intermediary of the routing wire portions 111A and 112A. The orientation of the liquid crystal 30 sandwiched between the rear-side substrate 10 and the observing-side substrate 20 changes as a voltage based on a drive signal is applied across the segment electrodes 111 and the common electrodes 112. This means that the regions at the intersections of the segment electrodes 111 and the common electrodes 112 function as pixels.

Figure 4:
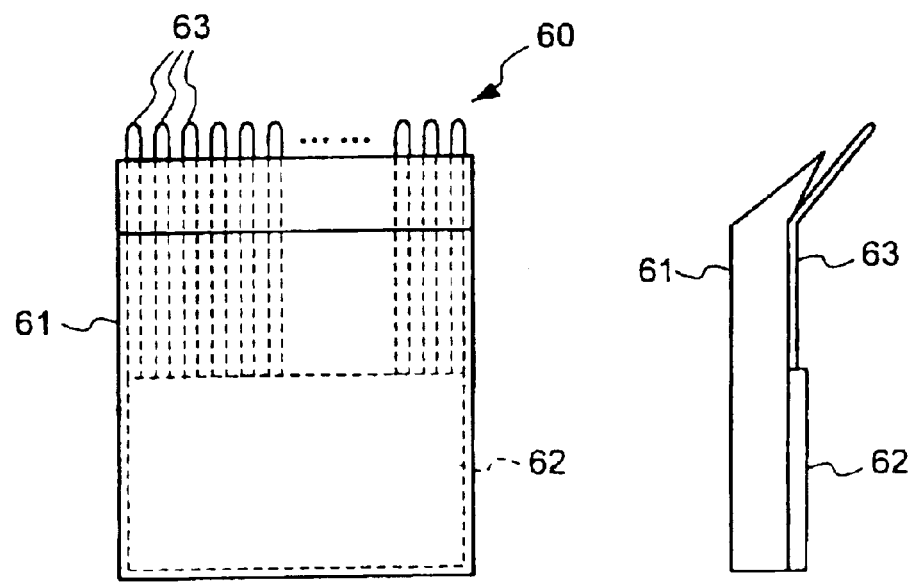
FIG. 4 shows a top plan view and a side view showing an appearance of an inspection apparatus used for a lighting inspection of the liquid crystal apparatus.

The configuration of the inspection apparatus used for the lighting inspection of a liquid crystal apparatus will now be described. FIG. 4 provides a top plan view and a side view that show the appearance of the inspection apparatus. As shown in the drawing, an inspection apparatus 60 has a main unit 61, a circuit board 62, and a plurality of inspection terminals 63. The main unit 61 is made of a substantially rectangular plate-like member, and formed such that the vicinity of one peripheral edge (the upper peripheral edge in FIG. 4) is sloped when observed from the other peripheral edge.

The circuit board 62 and the plurality of inspection terminals 63 are provided on one surface of the main unit 61. The circuit board 62 has diverse circuits for supplying inspection drive signals to the plurality of inspection terminals 63. Each of the inspection terminals 63 is a long member formed of a conductive material. One end of each of the inspection terminals 63 is connected to the circuit board 62. The portion in the vicinity of the other end of each of the inspection terminals 63 is bent along the slope of the main unit 61, and the distal end portion thereof projects from the peripheral edge of the main unit 61. As shown in FIG. 4, the distal end portions of the inspection terminals 63 are made thinner than the remaining portions thereof, and are arranged to be substantially aligned along the peripheral edge of the main unit 61.

Subsequently, a specific procedure for performing the lighting inspection of the liquid crystal apparatus by using the inspection apparatus 60 will be described. The inspection is performed on a liquid crystal panel before the driver IC 50 is mounted on the projection region 10A of the rear-side substrate 10.

Figure 5:
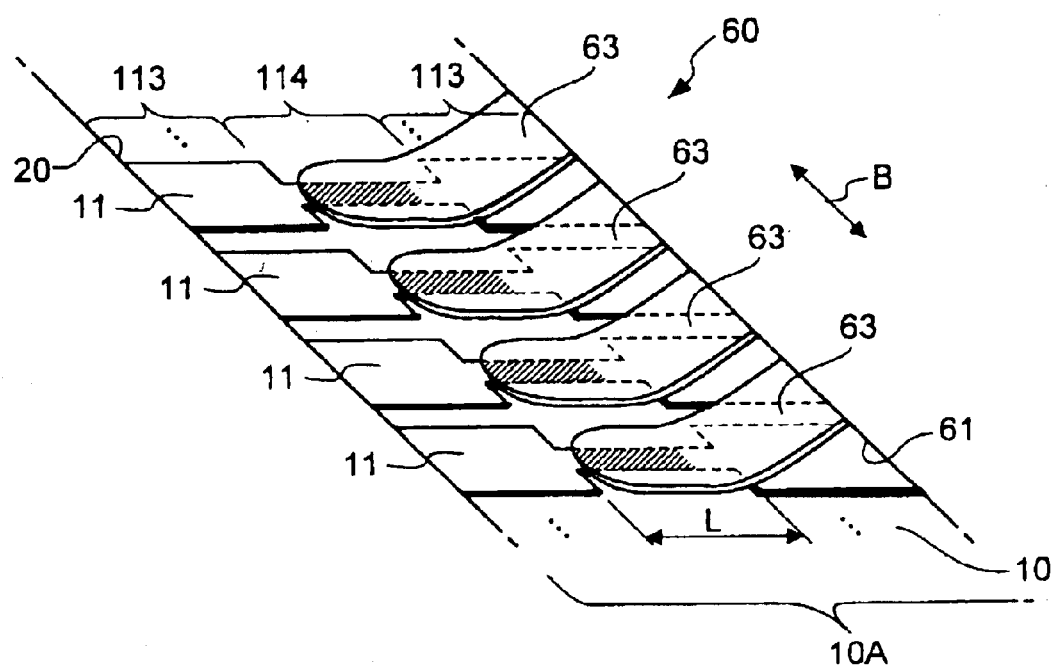
FIG. 5 is a perspective view illustrating a state wherein inspection terminals of the inspection apparatus and the routing wire portions of the liquid crystal apparatus are in contact during an inspection performed using the inspection apparatus.

First, as shown in FIG. 5, the plurality of inspection terminals 63 provided on the inspection apparatus 60 are respectively brought into contact with the second portions 114 of the routing wire portions 11 (111A and 112A) formed on the projecting region 10A. As stated above, the second portions 114 are formed to be aligned all over the routing wire portions 111A and 112A. Hence, all the plurality of inspection terminals 63 can be brought into contact with the second portions of all the routing wire portions 11 at a time.

Then, the inspection terminals 63 are flexed by abutting them against the routing wire portions 11. As a result, the ends and the adjacent portions of the inspection terminals 63 are brought into surface contact with the routing wire portions 11. In FIG. 5, the portions where the inspection terminals 63 and the routing wire portions 11 are in surface contact are hatched. In this embodiment, even when the flexed inspection terminals 63 are brought into surface contact with the routing wire portions 11, the inspection terminals 63 contact only the second portions 114 of the routing wire portions 11, not contacting the first portions 113. In other words, the position and a length L of the second portions 114 of the routing wire portions 11 in the extending direction thereof are decided based on the region where the inspection terminals 63 are brought into surface contact. A conceivable specific value for the length L is, for example, approximately 1 mm.

Next, with the inspection terminals 63 in contact with the second portions 114 of the routing wire portions 11, predetermined test drive signals are supplied from the circuit board 62 to the inspection terminals 63. The test drive signals are supplied to the segment electrodes 111 and the common electrodes 112 through the intermediary of the inspection terminals 63. The signal levels of the test drive signals and the electrodes to be supplied with the test drive signals are preset so as to cause all pixels to light up.

When all pixels of the liquid crystal apparatus are lit up by the supplied test drive signals, an operator visually observes a display surface to check for any pixels that are not normally lit up. As a result, it is determined that the liquid crystal apparatus is good in the case that all the pixels are normally lit while it is determined that liquid crystal apparatus is bad in the case that any one of the pixels are not lit, for which it can be considered that some kind of fault, such as a disconnected electrode, has taken place.

As described above, in this embodiment, the width of the portions (the second portions 114) of the routing wire portions 11 formed on the projecting region 10A that are to be in contact with the inspection terminals 63 is smaller than the width of the other portions (the first portions 113). In other words, the interval between the adjoining routing wire portions 11 is larger in the portions to be contacted by the inspection terminals 63 than the interval between the other portions. Hence, in the state shown in FIG. 5, for example, in the case that the inspection apparatus 61 is slightly shifted in the direction indicated by an arrow B in the drawing, or in the case that the positions of the inspection terminals 63 are slightly shifted at the time of bringing the inspection terminals 63 into contact with the routing wire portions 11, it will be possible to avoid a situation wherein the inspection terminal 63 to be brought into contact with a particular routing wire portion 11 undesirably contacts an adjoining routing wire portion 11. Thus, according to the embodiment, even in the case that the intervals among the routing wire portions 11 formed on the projecting region 10A (to be more precise, the intervals among the first portions 113 of the routing wire portions 11) are extremely small, accurate inspection can be performed.

Furthermore, as illustrated in FIG. 5, when the inspection terminals 63 formed to have thinner distal end portions are flexed and brought into surface contact with the routing wire portions 11, the portions other than the distal portions, i.e., the portions that are wider than the distal end portions, are also brought into contact with the routing wire portions 11. In this embodiment, not only the portions to be in contact with the distal end portions of the inspection terminals 63, but also the portions to be in contact with the wider portions of the inspection terminals 63 make up the second portions 114 of the routing wire portions 11. Therefore, even in the case that the wider portions of the inspection terminals 63 contact the routing wire portions 11, the portions will be effectively prevented from contacting other routing wire portions 11, thus permitting accurate inspection to be achieved.

As a configuration for avoiding the contact of the inspection terminal 63 with a routing wire portion 11 other than the desired routing wire portion 11, the width of all portions of the routing wire portions 11 might possibly be reduced (for example, the width could be the same width as that of the second portions 114 in this embodiment). In such a case, however, the wire resistance in the routing wire portions 11 would be increased, causing a problem in that the display quality of the liquid crystal apparatus is deteriorated or the routing wire portions 11 can easily be broken. This embodiment is advantageous in that the occurrence of such problems can be restrained since only the portions of the routing wire portions 11 that are to be in contact with the inspection terminals 63 are made narrower.

A liquid crystal apparatus according to a second embodiment of the present invention will now be described. This liquid crystal apparatus is of a transflective type that functions as a reflective type when there is sufficient outside light, while it functions primarily as a transmissive type by lighting a backlight unit when there is insufficient outside light.

Figure 6:
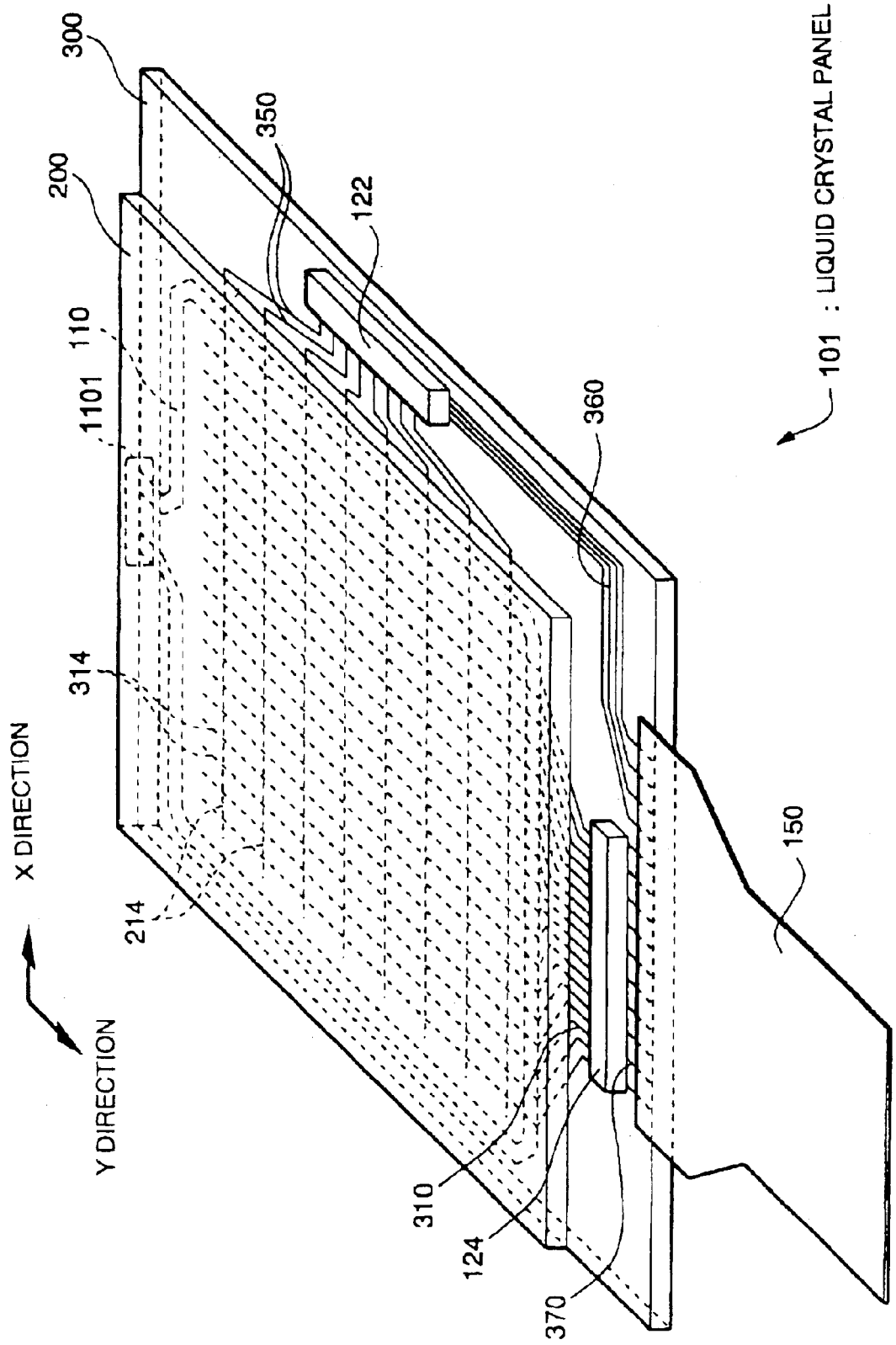
FIG. 6 is a perspective view showing general configuration of a liquid crystal apparatus according to a second embodiment of the present invention.

FIG. 6 is a perspective view showing an entire configuration of a liquid crystal panel of the liquid crystal apparatus.

As shown in the drawing, a liquid crystal panel 101 constituting the liquid crystal apparatus has an observing-side substrate 200 and a rear-side substrate 300 that are attached to each other through the intermediary of a frame-shaped sealing member, and liquid crystal 160 of, for example, a TN (Twisted Nematic) type, sealed in the gap therebetween. To be more specific, an opening is provided in a part of a sealing member 110, and the opening is sealed up by a sealing member 1101 after the liquid crystal is injected.

The surface of the observing-side substrate 200 that opposes the rear-side substrate 300 is provided with a plurality of common electrodes 214 that extend in a direction X. The surface of the rear-side substrate 300 that opposes the observing-side substrate 200 is provided with a plurality of segment electrodes 314 that extend in a direction Y. This means that, in a region where the common electrodes 214 and the segment electrodes 314 oppose each other, a voltage will be applied to the liquid crystal 160 by both electrodes, so that the intersection regions will function as sub-pixels.

A driver IC 122 for driving the common electrodes 214 and a driver IC 124 for driving the segment electrodes 314 are respectively mounted by the COG technology on two sides of the rear-side substrate 300 that project from the observing-side substrate 200. Furthermore, on one of the two sides, an FPC board 150 is joined to a region on the outer side of the region where the driver IC 124 is mounted.

The common electrodes 214 formed on the observing-side substrate 200 are connected, through the intermediary of the conductive particles mixed in the sealing member 110, to one end of each of the wires 350 formed on the rear-side substrate 300. Meanwhile, the other end of each of the wires 350 are connected to an output bump of the driver IC 122. This means that common signals output from the driver IC 122 are applied to the common electrodes 214 through the intermediary of the wires 350 and the conductive particles. The input bump of the driver IC 122 and the FPC board 150 are connected by wires 360.

The segment electrodes 314 formed on the rear-side substrate 300 are connected to the output bump of the driver IC 124. Accordingly, segment signals output from the driver IC 124 are directly applied to the segment electrodes 314. The input bump of the driver IC 124 and the FPC board 150 are connected by wires 370.

Figure 7:
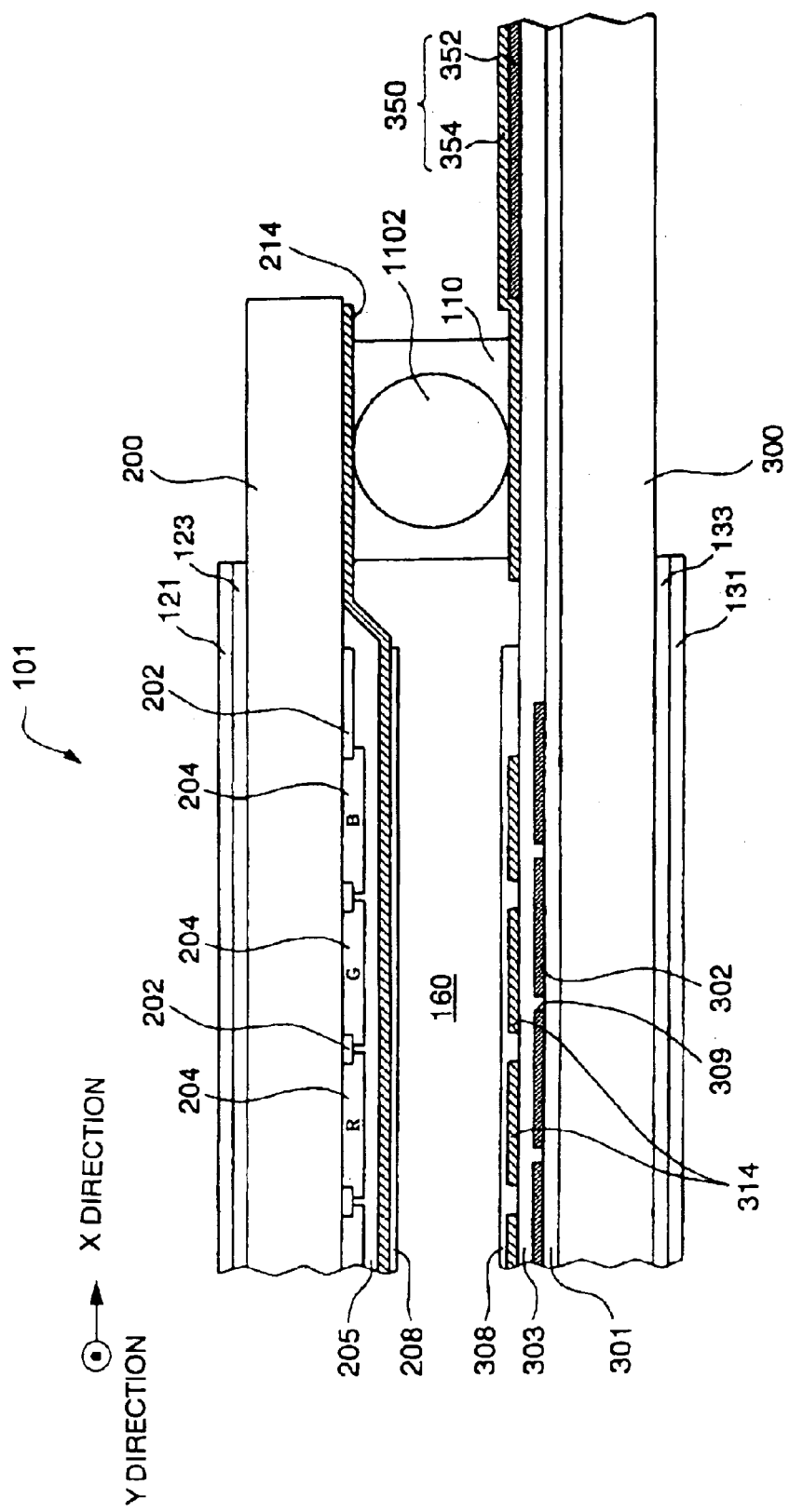
FIG. 7 is a partial sectional view showing configuration observed when a liquid crystal panel constituting the liquid crystal apparatus is cut in a direction of X.
Figure 8:
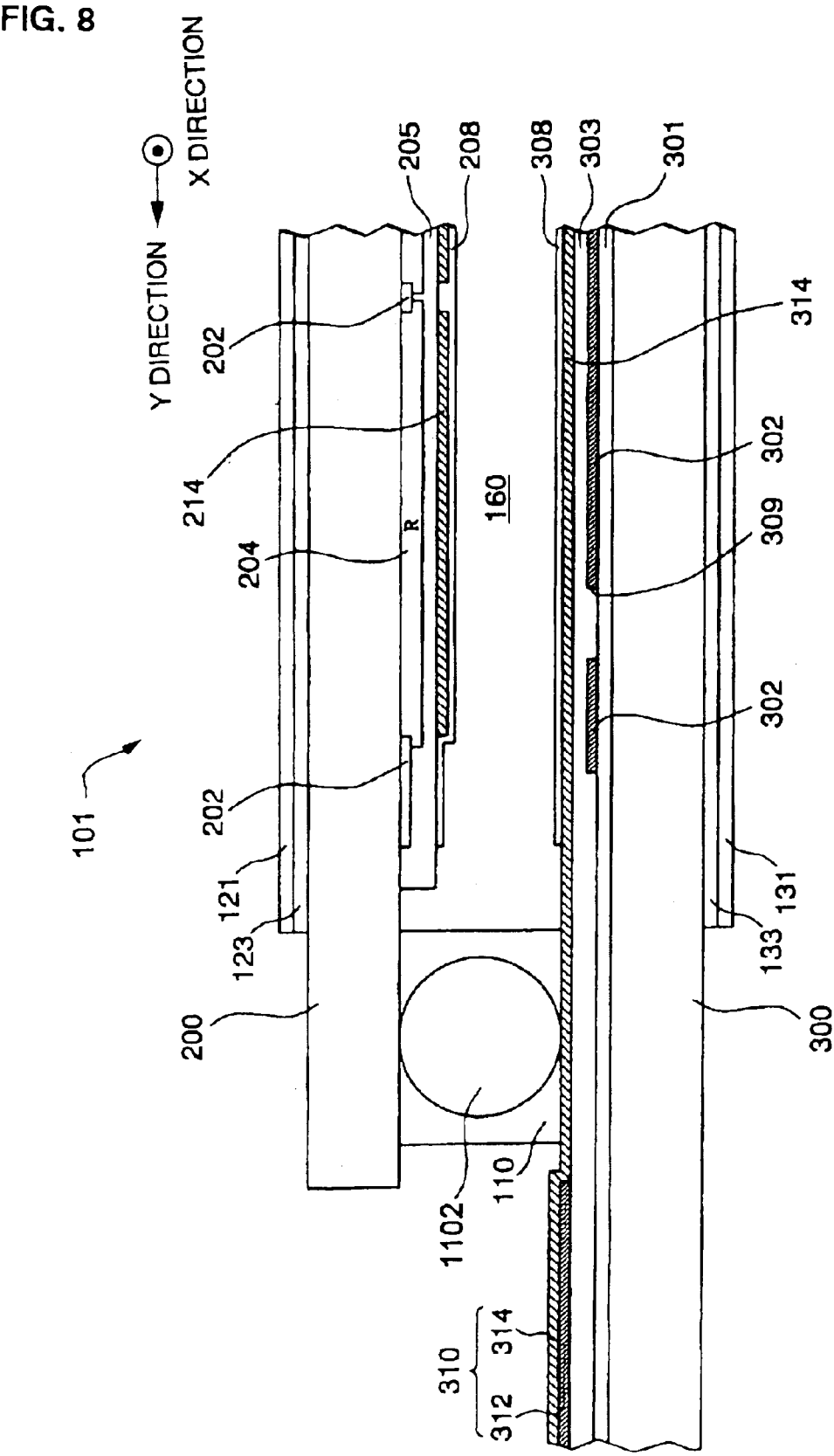
FIG. 8 is a partial sectional view showing configuration observed when the liquid crystal panel is cut in a direction of Y.
Figure 9:
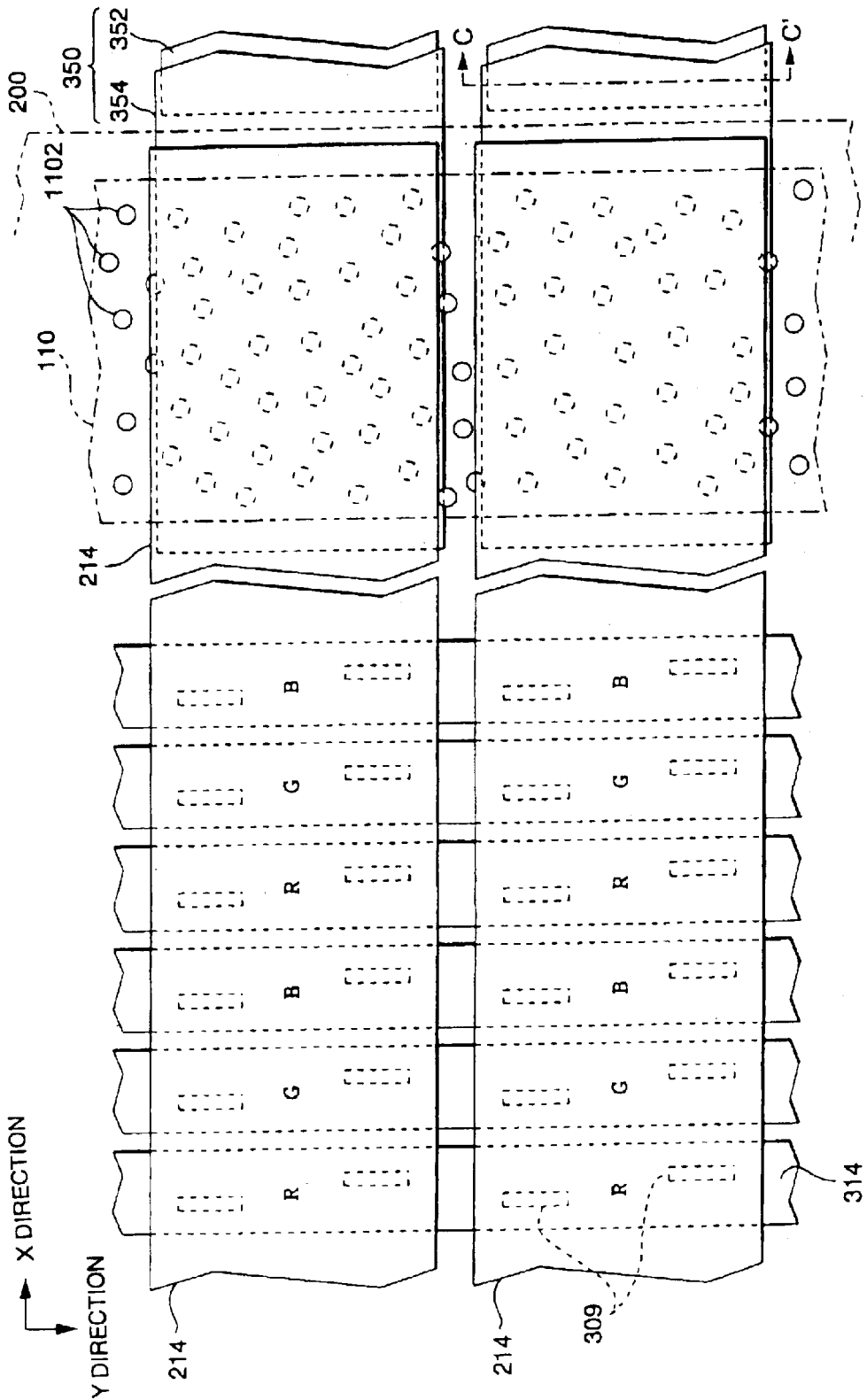
FIG. 9 is a top plan view showing configuration of pixels in the liquid crystal panel and configuration of the vicinity of a sealing member.

Referring now to FIG. 7 through FIG. 9, a detailed configuration of the liquid crystal panel 101 will be explained. FIG. 7 is a partial sectional view showing a configuration observed when the liquid crystal panel 101 is cut in a direction X in FIG. 6. FIG. 8 is a partial sectional view showing a configuration observed when the liquid crystal panel 101 is cut in a direction Y in FIG. 6. FIG. 9 is a top plan view perspectively showing, from the observing side, a detailed configuration of the wires in the vicinity of the side on which the driver IC 122 is mounted in the region where the sealing member 110 is formed.

As shown in FIG. 7 and FIG. 8, a phase difference plate 123 and a polarizer 121 are attached to the outer surface of the observing-side substrate 200. Meanwhile, a light-shielding film 202 is formed on the inner surface of the observing-side substrate 200 to prevent color mixture among the sub-pixels and also to function as a frame for defining a display region. Furthermore, color filters 204 are provided in a predetermined arrangement to correspond to the regions where the common electrodes 214 and the segment electrodes 314 intersect with each other (to correspond to the opening regions of the light-shielding film 202). This embodiment exemplifies a case where a stripe array is adopted, in which the color filters 204 of R (red), G (green), and B (blue) are aligned. Accordingly, a substantially square single pixel is provided for every three sub-pixels corresponding to R, G, and B; however, the arrangement mode of the sub-pixels of the colors is not limited thereto.

A planarizing film 205 formed of an insulating material removes a level difference between the light-shielding film 202 and the color filters 204. The aforesaid plurality of common electrodes 214 are formed on the surface of the planarizing film. Each of the common electrodes 214 is a band-shaped electrode formed of a transparent conductive material, such as ITO. An alignment layer 208 made of polyimide is formed on the surface of the planarizing film 205 and the common electrodes 214. The alignment layer 208 has been rubbed in a predetermined direction. The light-shielding film 202, the color filters 204, and the planarizing film 205 are unnecessary outside the display region. Hence, these elements are not provided on the outer side of the vicinity of the inner periphery of the sealing member 110, as shown in FIG. 7 and FIG. 8.

Meanwhile, a phase difference plate 133 and a polarizer 131 are attached to the outer surface of the rear-side substrate 300. The inner surface of the rear-side substrate 300 is entirely covered with a base film 301. A reflective film 302 is formed on the front surface of the base film 301. The base film 301 is a film for improving the adhesion of the reflective film 302 to a substrate. The reflective film 302 is formed by silver alone or an alloy or the like containing silver as its primary component. The light incident upon the liquid crystal panel 101 from the observing-side substrate 200 reflects on the surface of the reflective film 302 and exits to the observing side, thereby implementing reflective-type display. As shown in FIG. 7 through FIG. 9, in the reflective film 302, two openings 309 are provided for each sub-pixel. The emergent light from the backlight unit passes through the openings 309 and exits to the observing side, thereby implementing transmissive type display.

Subsequently, a configuration of the vicinity of the region where the sealing member 110 is formed in the liquid crystal panel 101 will be described. As shown in FIG. 9, the common electrodes 214 are provided such that they extend to the region where the sealing member 110 is formed on the observing-side substrate 200. On the other hand, a transparent conductive film 354 constituting the wires 350 is provided on the surface of the rear-side substrate 300 extending to the region where the sealing member 110 is formed so that it opposes the common electrodes 214. Thus, the common electrodes 214 on the observing-side substrate 200 and the transparent conductive film 354 on the rear-side substrate 300 are electrically connected through the intermediary of conductive particles 1102 dispersed in the sealing member 110. In FIG. 7 and FIG. 8, for the purpose of convenience, the conductive particles 1102 are shown in a significantly larger size than their actual size, so that it looks as if only one conductive particle 1102 is disposed in the width direction of the sealing member 110. Actually, however, numerous conductive particles 1102 are disposed in the width direction of the sealing member 110, as shown in FIG. 9.

Figure 10:
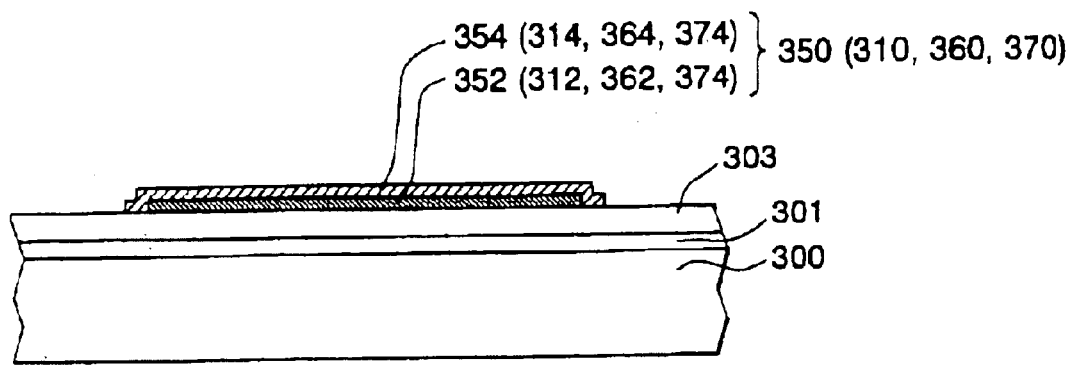
FIG. 10 is a sectional view taken at the line C–C' in FIG. 9.

The wires 350 are electrically connected to the common electrodes 214 and the output terminal of the driver IC 122, and a reflective conductive film 352 and a transparent conductive film 354 are laminated. Of these films, the reflective conductive film 352 in this embodiment is produced by patterning a conductive layer that is composed of silver alone or a silver alloy containing silver as its primary component formed by high temperature sputtering, for example. The transparent conductive film 354 is produced by patterning a conductive layer composed of the same material, such as ITO, as that of the segment electrodes 314 so that it is one size larger than the reflective conductive film 352. FIG. 10 is a sectional view taken at the line C–C' in FIG. 9. As shown in FIG. 10, the transparent conductive film 354 is formed so that its edge portion projecting beyond the reflective conductive film 352 contacts a protective film 303. However, as shown in FIG. 7 and FIG. 9, in the region where the sealing member 110 is formed, the reflective conductive film 352 is not formed, and only the transparent conductive film 354 is formed.

Meanwhile, the segment electrodes 314 are drawn out of the frame of the sealing member 110 on the rear-side substrate 300, deposited on the reflective conductive film 312, and drawn out as the wires 310 to the output bump of the driver IC 124, as shown in FIG. 8. To be more specific, the segment electrodes 314 drawn out of the sealing member 110 are formed to be one size larger than the reflective conductive film 312, as indicated by the parenthesized reference numerals in FIG. 10, such that the edge portion thereof projecting beyond the reflective conductive film 312 is in contact with the protective film 303.

Figure 11:
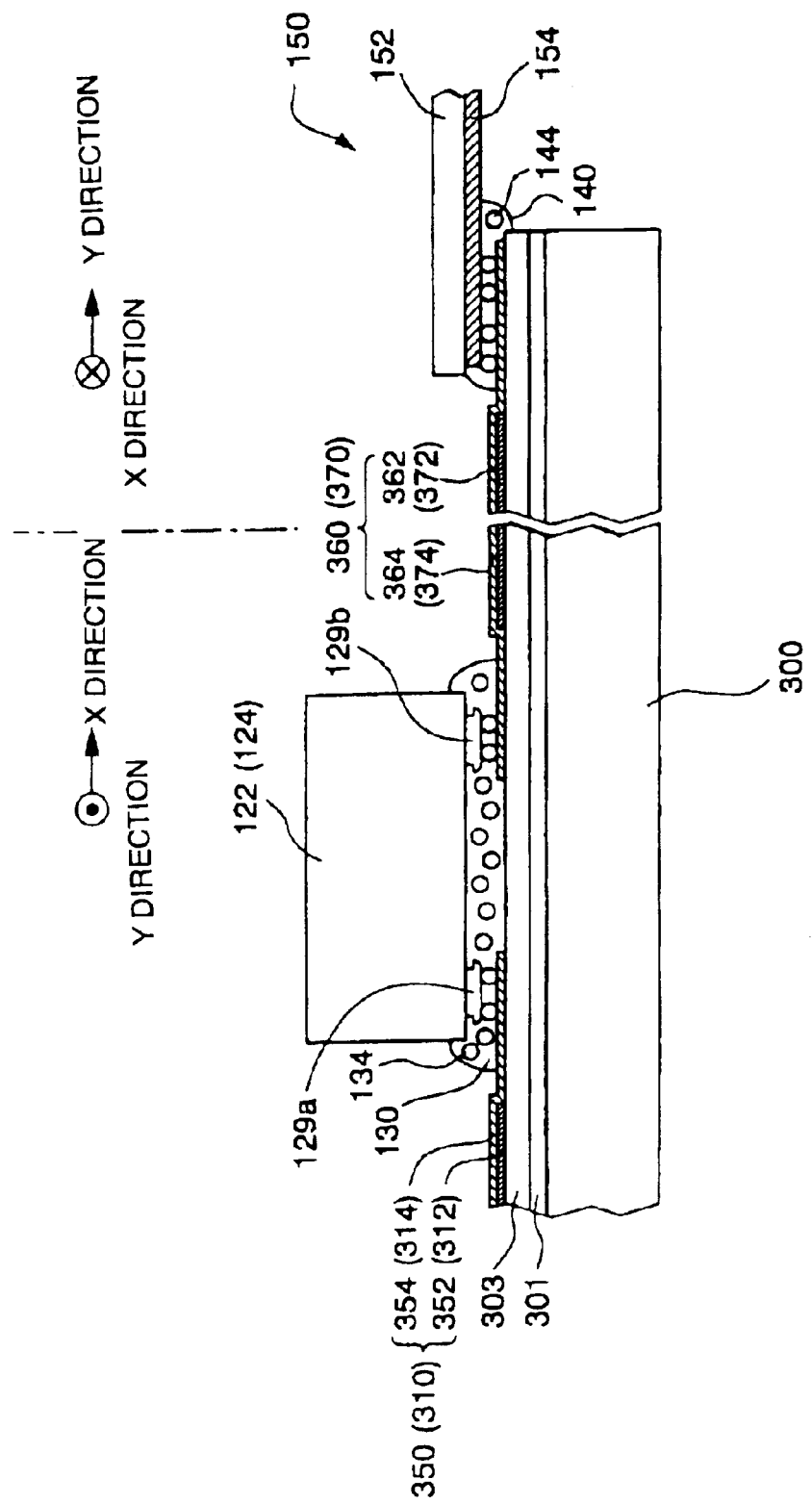
FIG. 11 is a partial sectional view showing the vicinity of a region wherein a driver IC is mounted in the liquid crystal panel.
Figure 12:
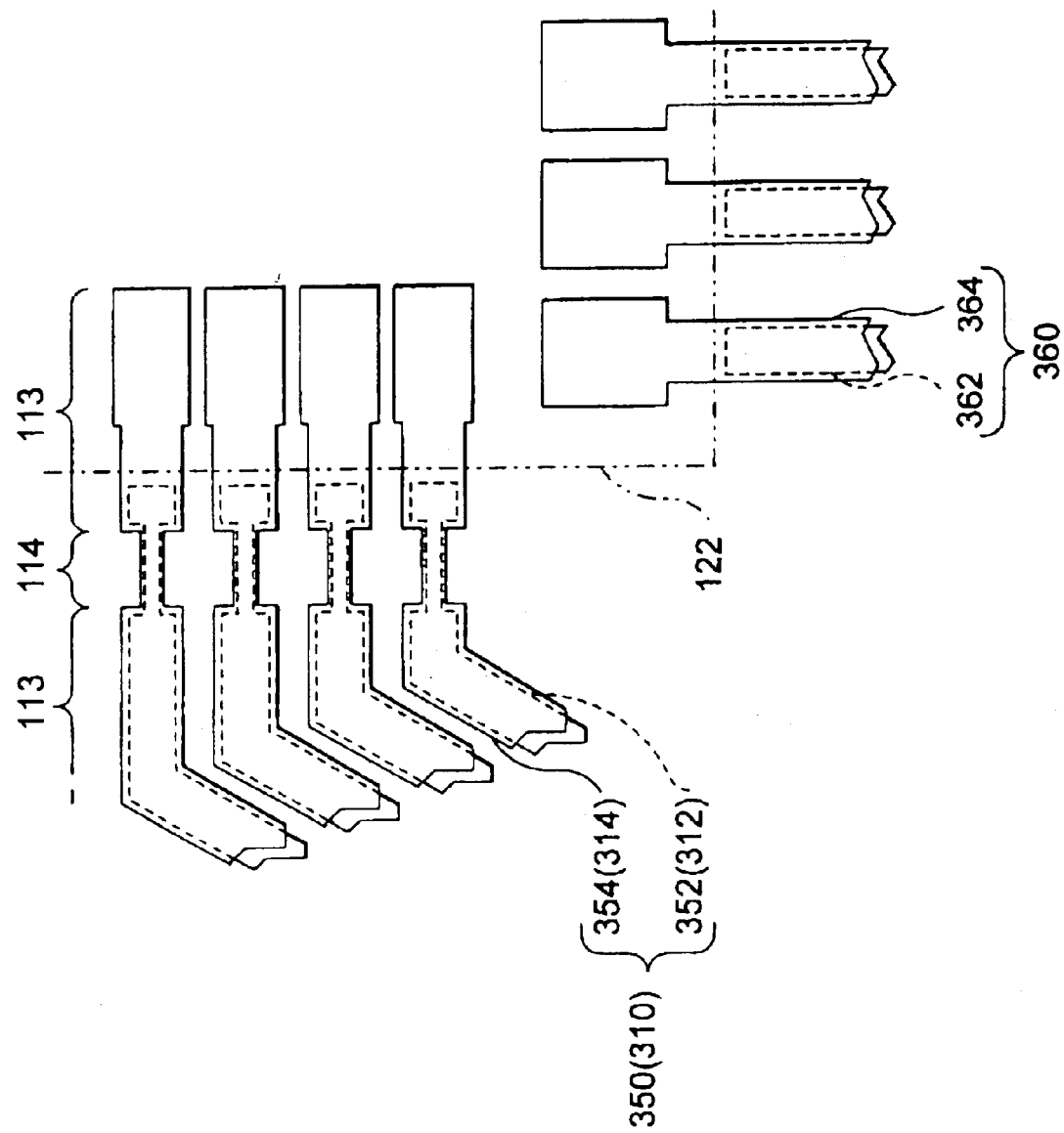
FIG. 12 is a partial top plan view showing the vicinity of the region wherein the driver IC is mounted in a rear-side substrate of the liquid crystal panel.

Subsequently, in the rear-side substrate 300, configurations of the region wherein the driver IC 122 or 124 is mounted, and the region wherein the FPC board 150 is mounted will be explained. FIG. 11 is a sectional view showing the configurations of these regions. FIG. 12 is a top plan view showing the configuration of the vicinity of the region wherein the driver IC 122 is mounted, as viewed from the observing side. As described above, the rear-side substrate 300 is provided with the wires 350, 360, and 370 in addition to the segment electrodes 314. Here, however, the descriptions will be given, taking the wires 350 and 360 related to the driver IC 122 as examples.

As shown in the drawings, the driver IC 122 is mounted by the COG technology on the rear-side substrate 300 through the intermediary of an anisotropic conductive film made of an adhesive agent 130, such as an epoxy resin, containing conductive particles 134 evenly dispersed therein. More specifically, with the driver IC 122 joined onto the rear-side substrate 300 by the adhesive agent 130, an output bump 129a of the driver IC 122 is electrically connected to the transparent conductive film 354 constituting the wires 350, and an input bump 129b for receiving signals from the FPC board 150 is electrically connected to a transparent conductive film 364 constituting the wires 360, respectively, through the intermediary of the conductive particles 134 in the adhesive agent 130.

As described above, the reflective conductive film 352 and the transparent conductive film 354 that are laminated form the wires 350 for supplying the common signals output from the driver IC 122 to the common electrodes 214. However, as shown in FIG. 11 and FIG. 12, the portion of the wires 350 that reaches the region wherein the driver IC 122 is mounted is not provided with the reflective conductive film 352, and provided only with the transparent conductive film 354, as in the case of the region wherein the sealing member 110 is formed. In other words, the reflective conductive film 352 is formed, avoiding the portion wherein the wires 350 and the driver IC 122 are connected.

Furthermore, as shown in FIG. 12, the wires 350 have first portions 113 that include both end portions of the wires 350, and second portions 114 having a width smaller than that of the first portions 113. The second portions 114 are the portions to be brought into contact with the inspection terminals 63 during the lighting inspection, as in the case of the first embodiment described above. As discussed above, in this embodiment, the wires 350 are formed of the laminated transparent conductive film 354 and the reflective conductive film 352 except for the portion covered by the sealing member 110 and the portion wherein the driver IC 122 is connected. Hence, as shown in FIG. 12, the second portions 114 of the wires 350 are also formed of the laminated transparent conductive film 354 and the reflective conductive film 352.

The wires 360 for supplying various signals supplied from the FPC board 150 to the driver IC 122 are configured as similarly as the wires 350. More specifically, the wires 360 are formed of a reflective conductive film 362 and a transparent conductive film 364 that are laminated, as indicated by the parenthesized reference numerals in FIG. 10. However, as shown in FIG. 12, in the wires 360, the portions where the driver IC 122 is mounted and the portions to which the FPC board 150 (not shown in FIG. 12) is joined are not provided with the reflective conductive film 362, and provided only with the transparent conductive film 364.

Here, the descriptions have been given by taking the wires 350 and 360 associated with the driver IC 122 as the examples. The wires 310 and 370 associated with the driver IC 124 have the same configurations as those of the wires 350 and 360, as respectively indicated by the parenthesized reference numerals in FIG. 11.

As in the case of the wires 350, the wires 310 for supplying the segment signals output from the driver IC 124 to the segment electrodes 314 have the first portions 113 that include both ends of the wires 310, and the second portions 114 that are narrower than the first portions 113. The reflective conductive film 312 and the transparent conductive film, namely, the segment electrodes 314, are laminated over a major part, including the second portions 114, of the wires 310. The reflective conductive film 312 is provided, avoiding the portion of the wires 310 where the driver IC 124 is mounted.

Meanwhile, as in the case of the wires 360, a reflective conductive film 372 and a transparent conductive film 374 that are laminated form the wires 370 for supplying a variety of signals supplied from the FPC board 150 to the driver IC 124. However, in the wires 370, the portion wherein the driver IC 124 is mounted and the portions wherein the FPC board 150 is joined are not provided with the reflective conductive film 374, but provided only with the transparent conductive film 374.

As in the case of the driver IC 122, the driver IC 124 is mounted on the rear-side substrate 300 through the intermediary of an anisotropic conductive film. Similarly, the anisotropic conductive film is used to join the FPC board 150 to the wires 360 and 370. More specifically, as shown in FIG. 11, a base member 152 of the FPC board 150 is joined onto the rear-side substrate 300 through the intermediary of an adhesive agent 140, and a wire 154 formed on the base member 152 is electrically connected to the transparent conductive film 364 constituting the wires 360 and the transparent conductive film 374 constituting the wires 370, respectively, through the intermediary of the conductive particles 144 in the adhesive agent 140.

Figure 13:
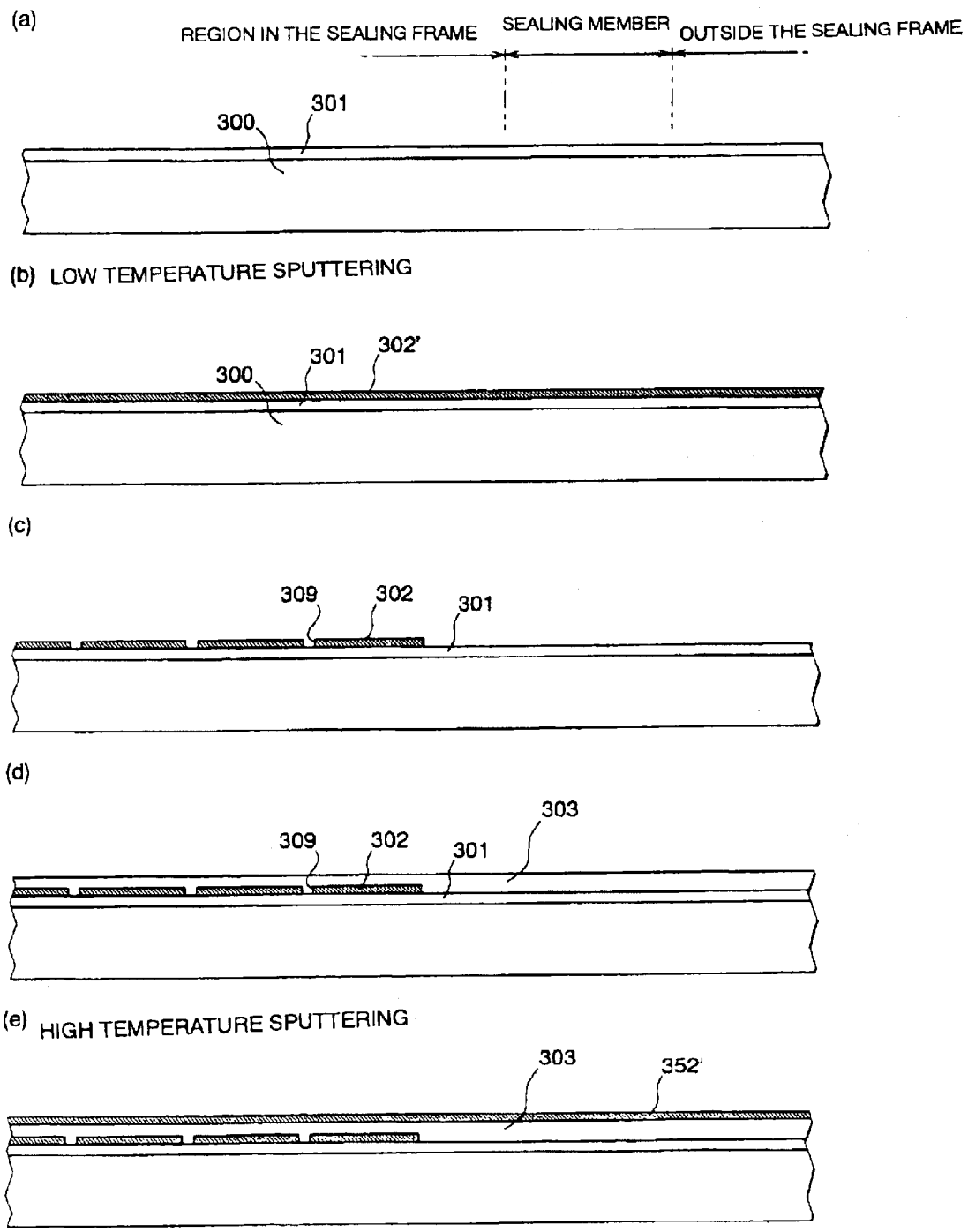
FIGS. 13 (*a*) through (*e*) are sectional views showing process steps for manufacturing the rear-side substrate in the liquid crystal panel.

Referring now to FIG. 13 and FIG. 14, the manufacturing process of the liquid crystal apparatus described above, especially the manufacturing process for the rear-side substrate will be explained. Here, centering around the segment electrodes 314 and the wires 350, the region inside the sealing member (the display region), the sealing member, and the region outside the sealing member will separately be described.

First, as shown in FIG. 13 (*a*), Ta$_2$O$_5$ or SiO$_2$ or the like is deposited by sputtering, for example, on the entire inner surface of the substrate 300 thereby to form the base film 301. Subsequently, as shown in (*b*) of the drawing, a reflective conductive layer 302' made of silver alone or silver as its primary component is formed by sputtering at a relatively low temperature (approximately 200° C.). Then, as shown in (*c*) of the drawing, the conductive layer 302' is patterned by photolithography and etching, thereby forming the reflective film 302 that has openings 309.

Thereafter, as shown in (*d*) of the drawing, the protective film 303 containing, for example, titanium oxide, is formed on the entire surface of the substrate so as to cover the reflective film 302. Furthermore, as shown in (*e*) of the drawing, a reflective conductive film 352' containing silver alone or silver as its primary component is formed on the protective film 303 by sputtering at a relatively high temperature (approximately 400° C.). The conductive layer 352' is desirably formed of an APC alloy of silver, palladium, and copper, an alloy of silver, copper, and gold, or an alloy of silver, ruthenium (Ru), and copper, as in the case of the conductive layer 302' making up the reflective film 302.

Next, as shown in FIG. 14 (*f*), the conductive layer 352' is patterned by using photolithography or etching to form the reflective conductive films 312, 362, and 372 making up the wires 310, 360, and 370 in addition to the reflective conductive film 352 making up the wires 350. Thereafter, as shown in (*g*) of the drawing, a transparent conductive layer 314' of ITO is formed by sputtering or ion plating.

Subsequently, as shown in (*h*) of the drawing, the conductive layer 314' is patterned by photolithography and etching. Thus, the segment electrodes 314 are formed inside the sealing frame, while the transparent conductive films 354, 364, and 374 are respectively formed outside the sealing frame. At this time, as shown in FIG. 10, the segment electrodes 314 and the transparent conductive films 354, 364, and 374 are formed so that their edges are in contact with the protective film 303. This makes it possible to prevent the reflective conductive films 312, 352, 362, and 372 from being exposed to the outside air after the conductive film 314' is formed, thus protecting them from corrosion or peeling. Next, as shown in (*i*) of the drawing, a polyimide solution, for example, is applied and baked onto the surface of the rear-side substrate 300 so as to form the alignment layer 308. Then, the alignment layer 308 is subjected to rubbing treatment.

After that, the rear-side substrate 300 obtained by the above process and the observing-side substrate 200 having the alignment layer 208, which has been subjected to the rubbing treatment, are attached together through the intermediary of the sealing member 110. Then, after liquid crystal is injected through an opening of the sealing member 110, the opening is sealed with the sealing agent 1101. Thereafter, the same lighting inspection as described in conjunction with the example shown in FIG. 5 in the foregoing first embodiment is performed. More specifically, also in this embodiment, in a state wherein all of a plurality of inspection terminals 63 provided on an inspection apparatus 60 are in surface contact with all second portions 114 of the wires 350 or 360, test drive signals are supplied to the common electrodes 214 and the segment electrodes 214. It is then determined whether the liquid crystal panel is good or bad based on an image displayed as a result. After such an inspection process, the driver ICs 122 and 124 as well as the FPC board 150 are mounted so as to obtain the liquid crystal panel 101 shown in FIG. 6.

Thus, also in this embodiment, the width of the second portions 114 of the wires 310 and 350 formed outside the sealing frame is made smaller than the first portions 113, as in the case of the foregoing first embodiment. Accordingly, even in the case of the small intervals among the wires, accurate inspection can be accomplished by bringing the inspection terminals 63 into contact with the second portions 114.

Furthermore, the liquid crystal apparatus according to this embodiment is adapted to make up a single pixel with a plurality of sub-pixels individually corresponding to different colors. A liquid crystal apparatus that enables such type of full-color display has more wires than a monochromic display liquid crystal apparatus having the same number of pixels, because a single pixel is constituted by three sub-pixels, resulting in smaller intervals among wires on a substrate. Hence, the present invention is markedly advantageous when applied to a liquid crystal apparatus that enables full-color display. It is needless to say, however, that the present invention can be advantageously applied to a monochromic display liquid crystal apparatus as well, as shown in the foregoing first embodiment.

In this embodiment, the wires 310, 350, 360, and 370 are respectively constructed by the segment electrodes 314, the transparent conductive films 354, 364, and 374, and the reflective conductive films 312, 352, 362, and 372 that are laminated. Therefore, the resistance can be reduced, as compared with a case where the wires are formed by any one single layer. In particular, the second portions 114 of the wires 310 and 350 are narrower than the remaining portions (the first portions 113), possibly leading to higher wire resistance. For this reason, forming the reflective conductive films 314 and 352 having relatively low resistance values in the second portions 114 results in particularly marked effect for restraining an increase in the wire resistance.

In this embodiment, the reflective conductive films 352 and 312 are respectively formed over a major part of the wires 310 and 350. However, from a viewpoint of controlling an increase in the resistance value caused by reducing the width of the second portions 114 in the wires 310 and 350, it is not always necessary to form the reflective conductive films 352 and 312 over the major part of the wires 310 and 350. Instead, the reflective conductive films may be formed only over the second portions 114 in the wires 310 and 350.

Furthermore, in this embodiment, the reflective conductive film 352 constituting the wires 350 is formed, avoiding the region wherein the sealing member 110 is formed and the region wherein the driver IC 122 is mounted. Similarly, the reflective conductive film 312 constituting the wires 310 is formed, avoiding the region wherein the driver IC 122 is mounted. This is because the reflective conductive film 352 formed of a silver alloy has lower adhesion to another material than a transparent conductive film formed of ITO, and therefore, is not desirably provided in a portion subjected to an external force. In other words, if priority is given to reduced wire resistance, then it is desirable to form a reflective conductive film all over the base layer of segment electrodes or a transparent conductive film. However, in the case of this configuration, the adhesion between the reflective conductive film and the rear-side substrate 300 is low. Therefore, it is very likely that the reflective conductive film positioned in the region wherein a driver IC is mounted comes off from the rear-side substrate 300, for example, when an external force is applied to the driver IC. For this reason, in this embodiment, the reflective conductive film is not formed in the regions of the wires that may be subjected to an external force, namely, the region wherein the sealing member 110 is formed, the region wherein the driver IC is mounted, and the region wherein the FPC board is mounted. Instead, only the transparent conductive film made of ITO is formed, thus preventing the reflective conductive film from peeling off.

In the second embodiment, the protective film 303 is formed to cover the entire surface of the rear-side substrate 300 on which the reflective film 302 has been formed, then the reflective conductive films 312, 352, 362, and 372 are formed on the surface of the protective film 303. This embodiment is configured so that the same layer forms the reflective film 302 and the reflective conductive films 312, 352, 362, and 372. More detailed explanation will be given below.

Figure 15:
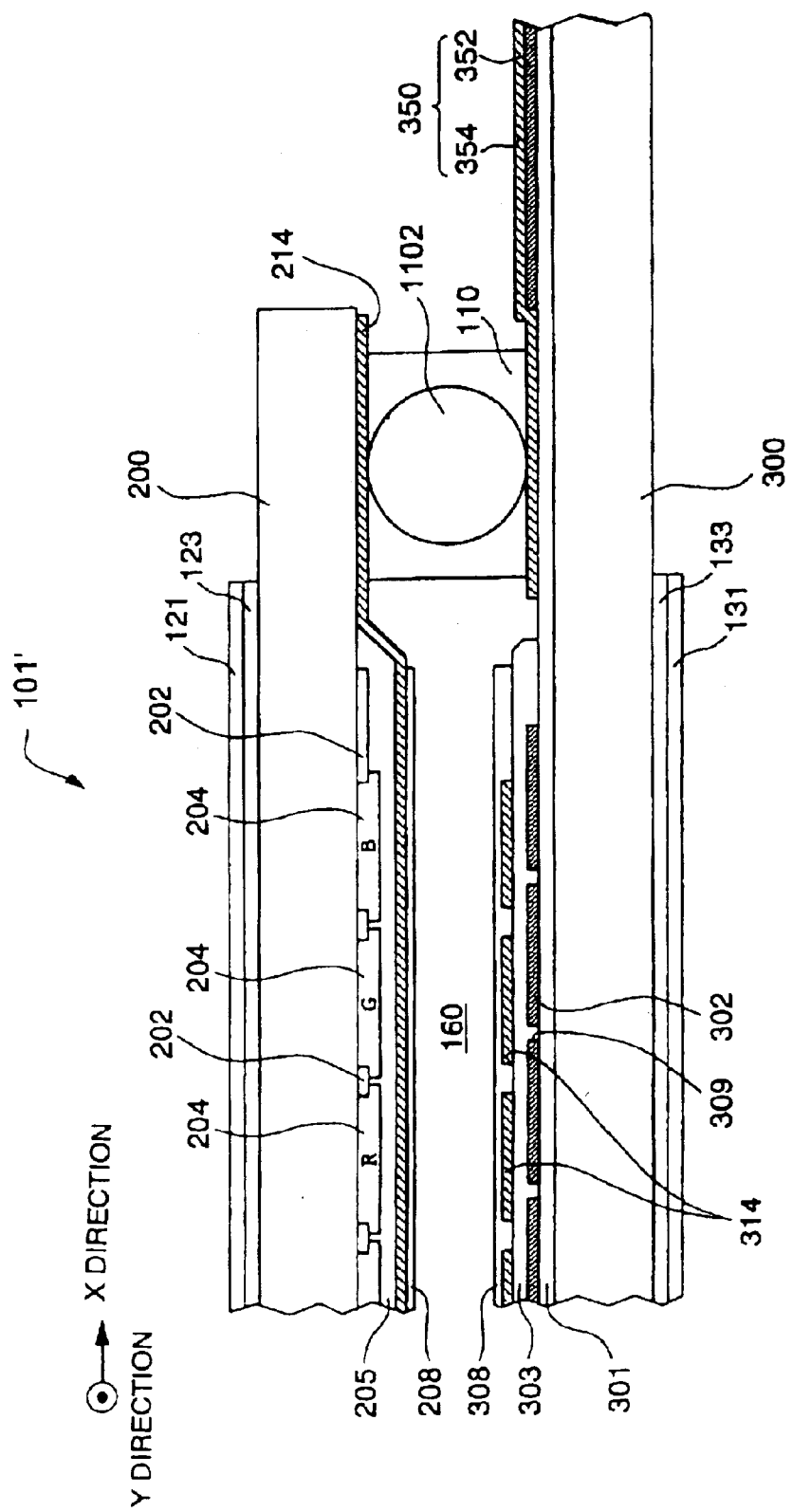
FIG. 15 is a partial sectional view showing configuration observed when a liquid crystal panel of a liquid crystal apparatus according to a third embodiment of the present invention is cut in a direction of X.
Figure 16:
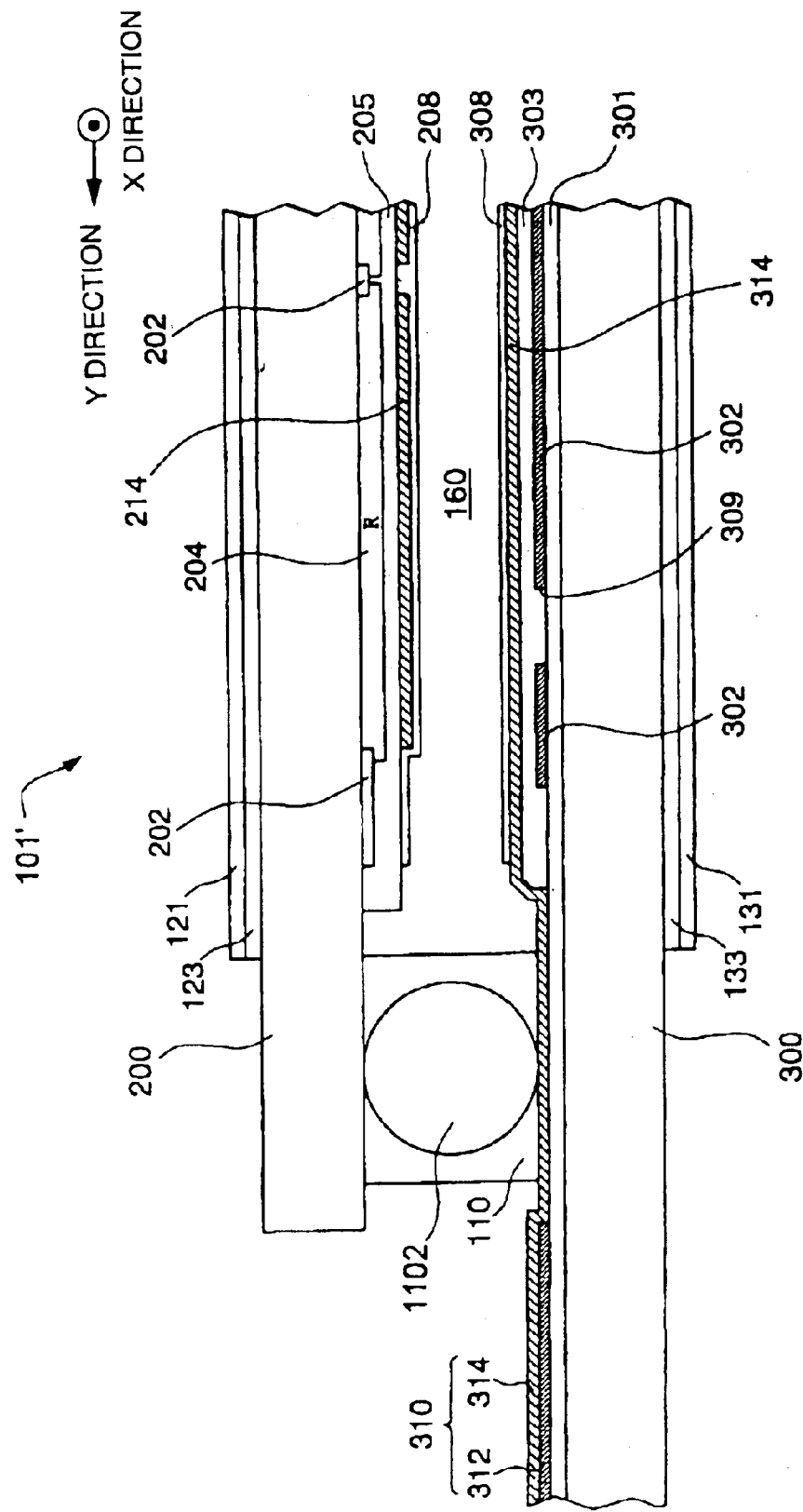
FIG. 16 is a partial sectional view showing configuration observed when the liquid crystal panel is cut in a direction of Y.

In a liquid crystal apparatus according to this embodiment, a general configuration of a liquid crystal panel thereof is approximately the same as the second embodiment (refer to FIG. 6). However, a liquid crystal panel 101' in this embodiment is different from the liquid crystal panel 101 according to the second embodiment (refer to FIG. 7 and FIG. 8) in that a protective film 303 is formed only inside a sealing frame, as shown in FIG. 15 and FIG. 16. FIG. 15 and FIG. 16 correspond to FIG. 7 and FIG. 8, respectively, in the foregoing second embodiment.

Thus, in this embodiment, the protective film 303 is not formed outside the sealing frame, so that wires 310, 350, 360, and 370 are provided on a base film 301 rather than on the protective film 303. This means that the peripheral portions of transparent conductive films 314, 354, 364, and 374 and reflective conductive films 312, 352, 362, and 372 contact the base layer 301. The rest of the configuration, including the mode of wires, is the same as that shown in the second embodiment, and the descriptions thereof will be omitted.

The liquid crystal panel 101' according to the embodiment is fabricated by the following process. Specifically, in the step shown in FIG. 13 (b), a conductive film 302' is formed to cover the rear-side substrate 300, on which the base film 301 has been formed, then the conductive film 302' is patterned by photolithography and etching to simultaneously form the reflective film 302 having openings 309 inside the sealing frame, and the reflective conductive films 352, 312, 362, and 372 outside the sealing frame, respectively. Subsequently, in the rear-side substrate 300, the protective film 303 is formed, for example, from titanium oxide, to cover the reflective film 302 inside the sealing frame. The process after this is the same as that of the first embodiment, so that the descriptions thereof will be omitted.

Thus, according to the embodiment, the reflective film 302 and the reflective conductive films 352, 312, 362, and 372 are formed in the same step, such that the manufacturing process can be simplified, and the manufacturing cost can be reduced, as compared with a case where they are formed in separate steps (a step of forming film by sputtering and a patterning step).

The above first to third embodiments have illustrated the liquid crystal apparatuses employing liquid crystal as the electro-optical material. This embodiment will illustrate a case where the present invention is applied to an EL apparatus employing an EL luminescent layer as its electro-optical material.

Figure 17:
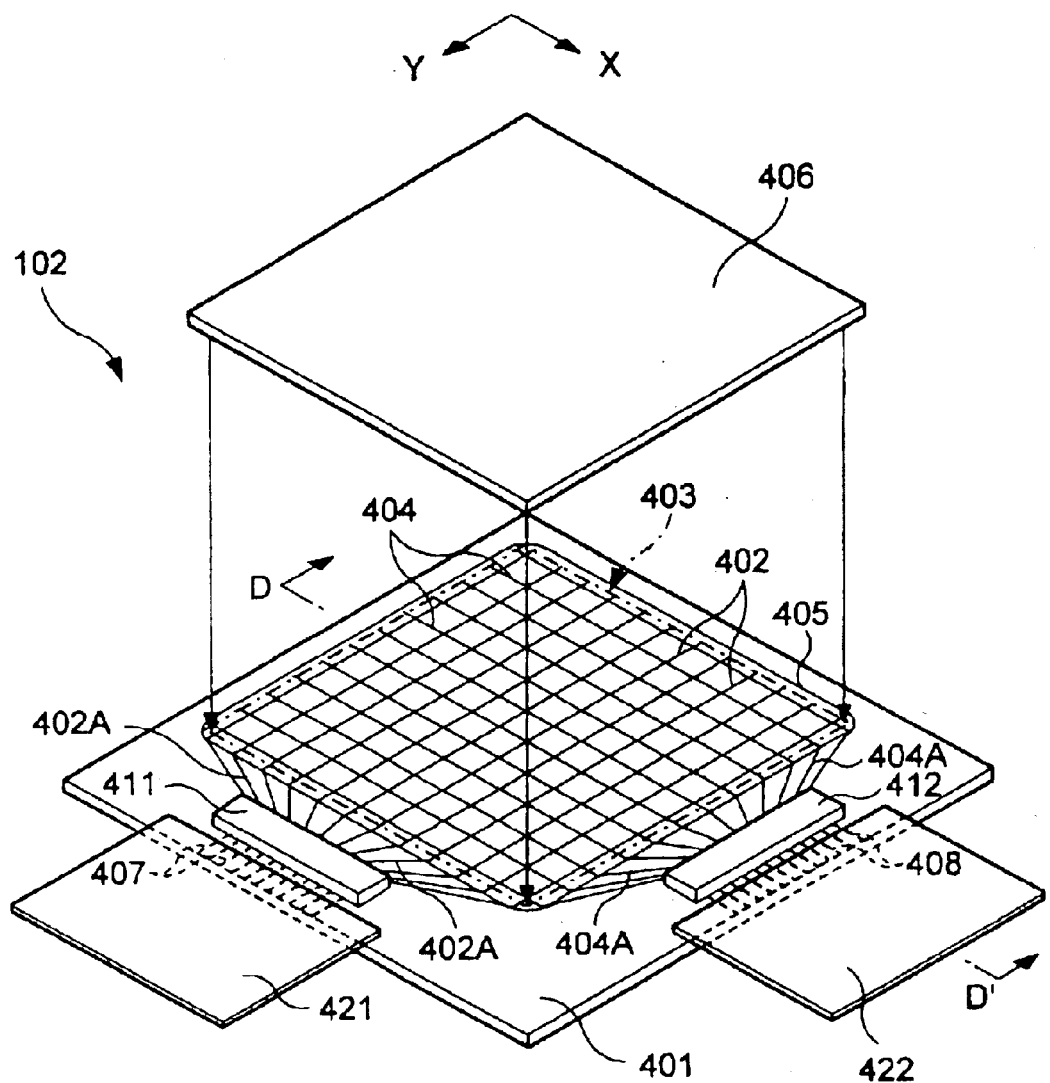
FIG. 17 is a perspective view showing general configuration of an EL apparatus according to a fourth embodiment of the present invention.
Figure 18:
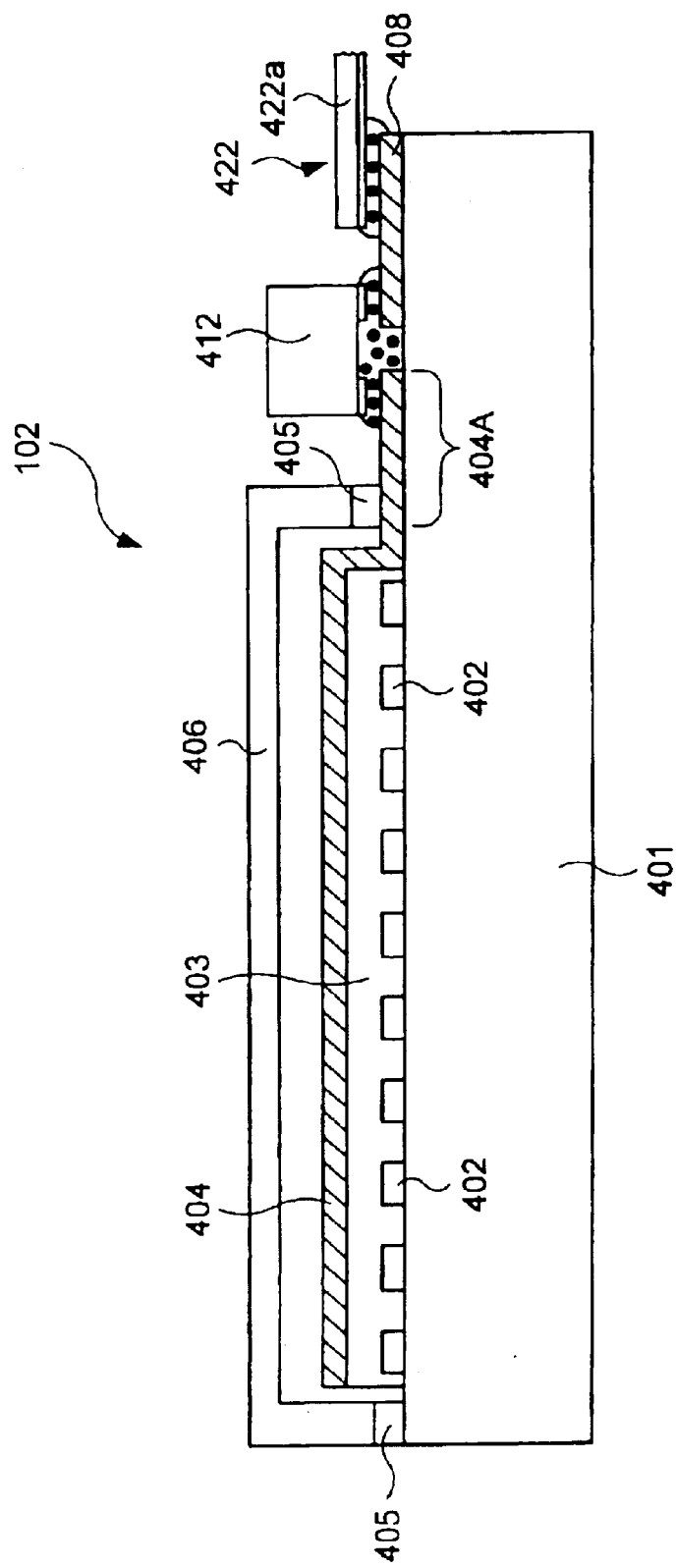
FIG. 18 is a sectional view taken at the line D–D' in FIG. 17.

FIG. 17 is a perspective view showing appearance of the EL apparatus according to this embodiment. FIG. 18 is a sectional view taken at the line D–D' in FIG. 17. As shown in these drawings, the EL apparatus has a driver ICs 411 and 412 as well as FPC boards 421 and 422 that are mounted on a substrate 401 making up an EL panel 102.

The EL panel 102 has a light-transmitting substrate 401 made of glass, quartz, or plastics, for example. A plurality of segment electrodes 402 are formed on the surface of the substrate 401. Each of the segment electrodes 402 is a band-shaped electrode extending in a direction Y in the drawing, and is formed of a transparent conductive material, such as ITO. Furthermore, an EL luminescent layer in an even thickness 403 is deposited on the surface of the substrate 401 on which the segment electrodes 402 have been formed. Furthermore, a plurality of common electrodes 404 are formed on the surface of the EL luminescent layer 403, the surface being on the opposite side from the segment electrodes 402. Each of the common electrodes 404 is a band-shaped electrode extending in a direction for intersecting with the segment electrodes 402. The common electrodes 404 are formed from a metal alone, such as aluminum or silver, or an alloy containing at least one of them as its primary component, and have light reflecting properties. Furthermore, on the surface of the substrate 401, a frame-shaped sealing member 405 is formed to surround the EL luminescent layer 403, and a cover 406 is mounted via the sealing member 405.

As shown in FIG. 17, driver ICs 411 and 412 are mounted by the COG technology in the region of the surface of the substrate 401, and the region is located outside the sealing member 405. As shown in FIG. 18, the common electrodes 404 cross the sealing member 405 to reach the outer side of the sealing member 405, and the ends thereof are connected to an output bump of the driver IC 412. Similarly, the segment electrodes 402 extend to reach the outer side of the sealing member 405, and the ends thereof are connected to an output bump of the driver IC 411. Portions 404a of the common electrodes 404 that extend beyond the sealing frame and portions 402a of the segment electrodes 402 that extend beyond the sealing frame have first portions 113 and second portions 114 having a width smaller than that of the first portions 113, as in the case of the routing wire portions 11 of the liquid crystal panel according to the foregoing first embodiment shown in FIG. 1. The second portions 114 are the portions to which the inspection terminals 63 are to be brought into contact during the lighting inspection.

In the vicinity of the periphery of the substrate 401, panel terminals 407 and 408 are formed. The panel terminals 408 are connected to an input bump of the driver IC 412, as shown in FIG. 18. Similarly, the panel terminals 407 are connected to an input bump of the driver IC 411. The FPC boards 421 and 422 are respectively joined, through the intermediary of an anisotropic conductive film, to the vicinity of the periphery of the substrate 401 where the panel terminals 407 and 408 are formed. Thus, while the wires formed on a base member 421a of the FPC board 421 connect to the panel terminals 407, the wires formed on a base member 422a of the FPC board 422 connect to the panel terminals 408. In this configuration, the driver ICs 411 and 412 are respectively driven by signals supplied through the intermediary of the FPC substrates 421 and 422 from an external circuit, which is not shown in the drawing. As a result, a predetermined voltage is applied across the segment electrodes 402 and the common electrodes 404 to cause the EL luminescent layer 403 installed between the two electrodes to emit light. At this time, the common electrodes 404 function also as a reflective film.

The EL apparatus according this embodiment also provides the same advantage as that of the first embodiment. More specifically, also in this embodiment, the width of the second portions 114 of the segment electrodes 402 and the common electrodes 404 that extend beyond the sealing frame is made smaller than the width of the first portions 113. Therefore, when the lighting inspection is performed before the driver ICs 411 and 412 are mounted on the EL panel 102, the inspection terminals 63 are brought into surface contact with the second portions 114 in the same manner as that illustrated in FIG. 5. Thus, accurate inspection can be performed even with the small intervals among the wires.

The embodiments of the present invention have been described. The embodiments are strictly for the purpose of exemplification, and a variety of modifications may be added within a scope that does not depart from the spirit of the present invention. Such modifications may include, for example, the following.

Figure 19:
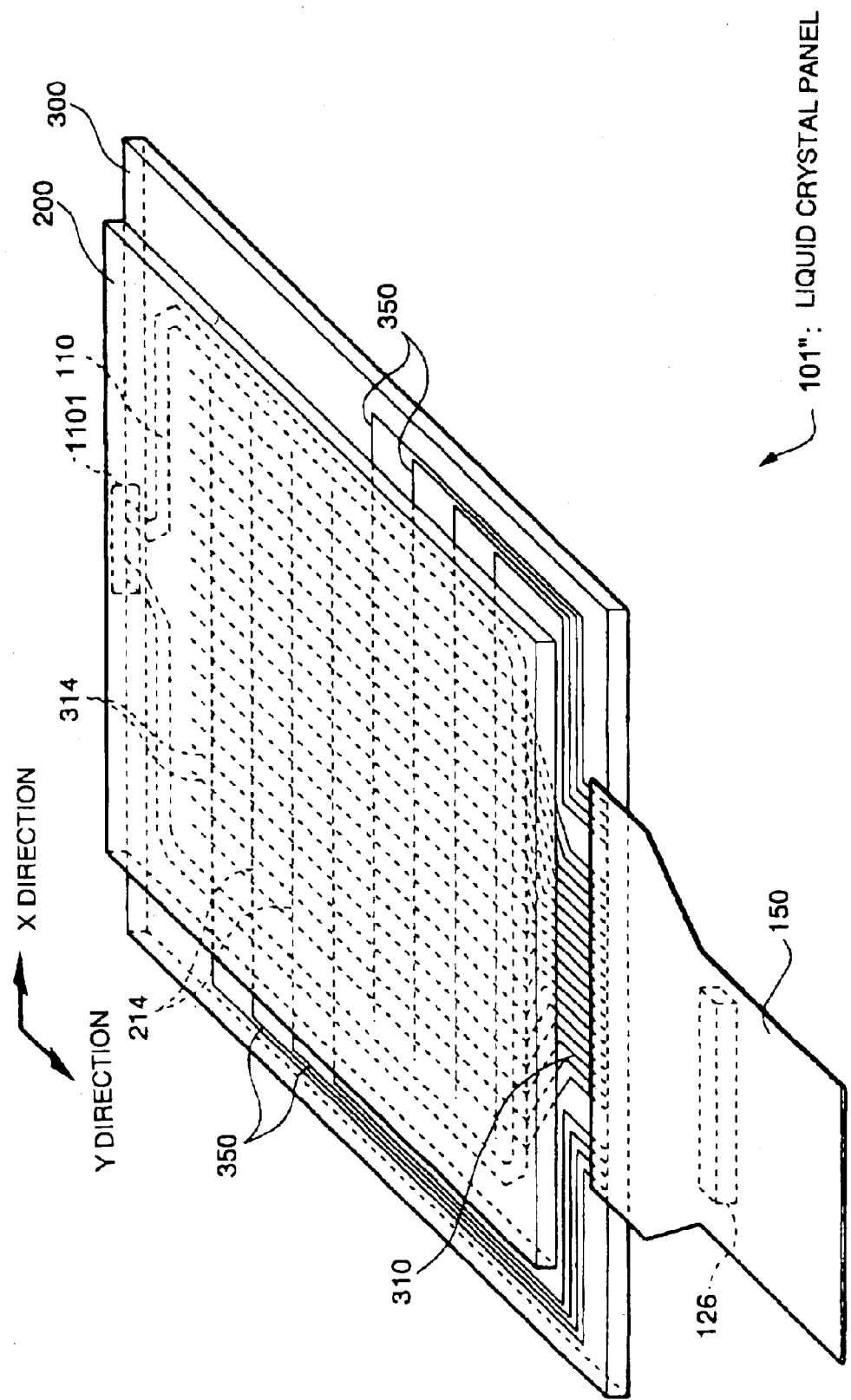
FIG. 19 is a perspective view showing general configuration of a liquid crystal apparatus according to a modification of the present invention.

In an electro-optical device in which a driver IC is mounted on a substrate, the intervals among the wires, in particular, must be made smaller since it is necessary to concentrate the wires that are formed on the substrate such that they reach a region wherein the driver IC is mounted. Hence, the present invention can provide an especially marked advantage when applied to an electro-optical device in which a driver IC is mounted on a substrate. However, this does not limit the application scope of the present invention. More specifically, there may be a situation that the intervals among wires have to be set small, provided with a greater number of electrodes in order to meet a demand for a higher definition of display. In consideration of such a situation, the present invention can be effectively applied to, for example, an electro-optical device as well, in which a driver IC is mounted on an FPC substrate. To be more specific, as shown in FIG. 19, the present invention can be also applied to an electro-optical device (a liquid crystal apparatus in this case) in which no driver IC is mounted on a substrate. In the liquid crystal apparatus shown in the drawing, a driver IC 126 is mounted on an FPC board 150 by a technology, such as flip chip bonding. In this case, wires 310 and 350 for connecting the FPC board 150 with common electrodes 214 or segment electrodes 314 are provided with first portions 113 and second portions 114 that are narrower than the first portions 113, as in the case of the foregoing embodiments. By using TAB (Tape Automated Bonding) technology, it is also possible to bond the driver IC 126 at its inner leads, and to join it to a liquid crystal panel 100 at its outer leads.

In the first to third embodiments described above, the liquid crystal apparatus of a passive matrix type is exemplified. The present invention can also be applied to an active matrix type liquid crystal apparatus. A conceivable active matrix type liquid crystal apparatus is provided with, for example, a two-terminal switching element represented by a TFD (Thin Film Diode) or a three-terminal switching element represented by a TFT (Thin Film Transistor).

The first to third embodiments described above exemplify the cases where only one substrate of a pair of substrates holding liquid crystal therebetween has the region projecting beyond the other substrate. The application of the present invention is not limited to such a liquid crystal apparatus. The present invention can also be applied to a liquid crystal apparatus in which both of a pair of substrates have the regions that project beyond the other substrate, and wires are formed in the regions of the individual substrates. Thus, the present invention can be applied to a liquid crystal apparatus as long as at least one of a pair of substrates that hold liquid crystal therebetween has a region that projects beyond the other substrate.

The embodiments described above exemplify the cases where the middle portions of the wires are formed in the region other than the region in the substrate that opposes the electro-optical device and serve as the second portions having a width smaller than that of the first portions positioned at both ends of the wires. However, this does not limit the position of the second portions. For example, the second portions may be provided by reducing the width of the vicinity of the end portions at one side (e.g., the portions to be connected with the terminals of a driver IC) of the wires. In brief, an important point is that the width of any portions (the second portions) of the wires (routing wire portions) are formed in a region other than the region in a substrate that opposes an electro-optical device, and the width of the portions is smaller than the width of the remaining portions (the first portions).

In the embodiments described above, both of the wires connected to the common electrodes and the wires connected to the segment electrodes have the first portions 113 and the second portions 114. Alternatively, however, only one of them may have the first portions 113 and the second portions 114. Considering that the present invention is especially markedly advantageous when applied to a case where intervals among wires are small, the wires connected to common electrodes or segment electrodes, whichever have more electrodes, are desirably equipped with the second portions 114. For instance, a typical electro-optical device has more segment electrodes than common electrodes. Accordingly, considering that the number of wires connected to segment electrodes is greater than the number of wires connected to common electrodes, the wires connected to the segment electrodes are preferably provided with the first portions 113 and the second portions 114.

In the embodiments described above, the image displayed on the electro-optical device has been visually checked by an operator to determine whether the apparatus is good or bad. However, the technique for determining whether it is good or bad is not limited thereto. For example, a displayed image may be photographed by a CCD camera, and the image may be subjected to image processing by using a personal computer, such that check for any pixels that are not ON is conducted. Also, whether the electro-optical device is good or bad is determined based on the result. Furthermore, in the foregoing embodiments, all pixels have been turned ON in the inspection process. Alternatively, however, pixels may be selectively turned ON to cause them to display a predetermined test pattern.

In the above embodiments, the liquid crystal apparatus using liquid crystal as the electro-optical material, and the EL apparatus using the EL luminescent layer as the electro-optical material are exemplified; however, the applications of the present invention are not limited thereto. For example, the inspection method in accordance with the present invention can be also applied to the lighting inspections of diverse electro-optical devices, including a plasma display (PDP). In other words, the present invention can be applied to diverse electro-optical devices having a plurality of wires densely formed on a substrate.

Now described is a specific example wherein the electro-optical device in accordance with the present invention is applied to electronic equipment.

Figure 20:
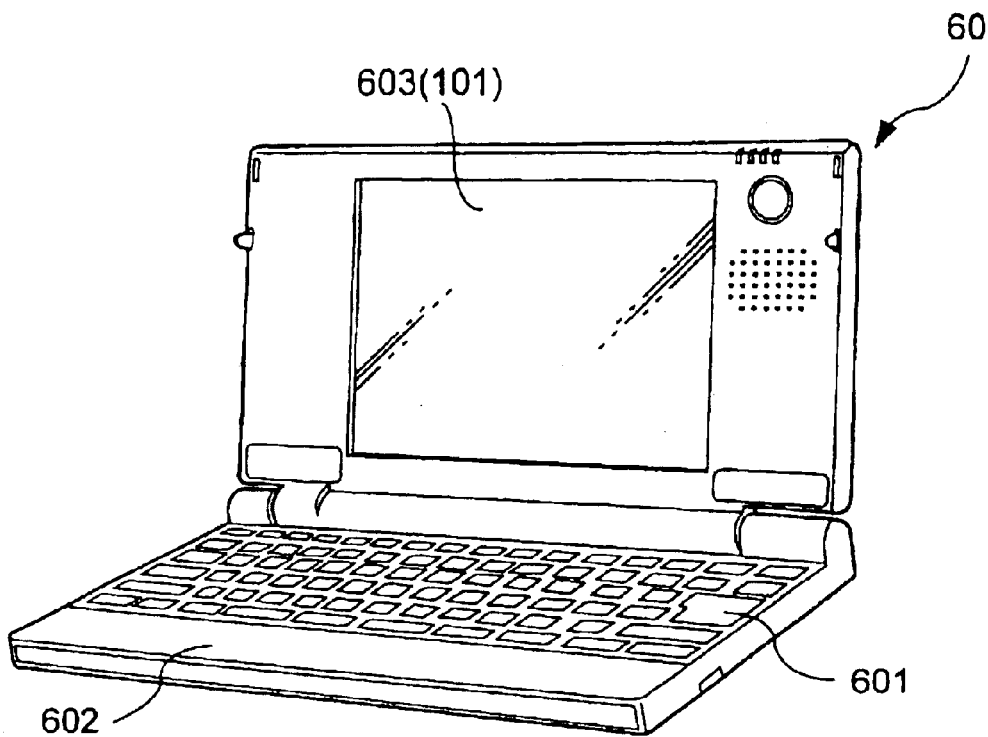
FIG. 20 is a perspective view showing configuration of a personal computer that is an example of electronic equipment using an electro-optical device according to the present invention.

First, an example will be described, in which the liquid crystal apparatus shown in the above second embodiment is applied to a mobile personal computer. FIG. 20 is a perspective view showing a configuration of the personal computer. In the drawing, a personal computer 600 is constructed by a main unit 602 equipped with a keyboard 601, and a liquid crystal display unit 603. The liquid crystal display unit 603 has the liquid crystal panel 101 shown in the second embodiment and a backlight (not shown in the drawing) disposed at the rear of the liquid crystal panel 101. Thus, the display unit works as a reflective type in the presence of outside light, while it works as a transmissive type by turning the backlight ON in the case of insufficient outside light, thereby allowing display to be visually checked.

Figure 21:
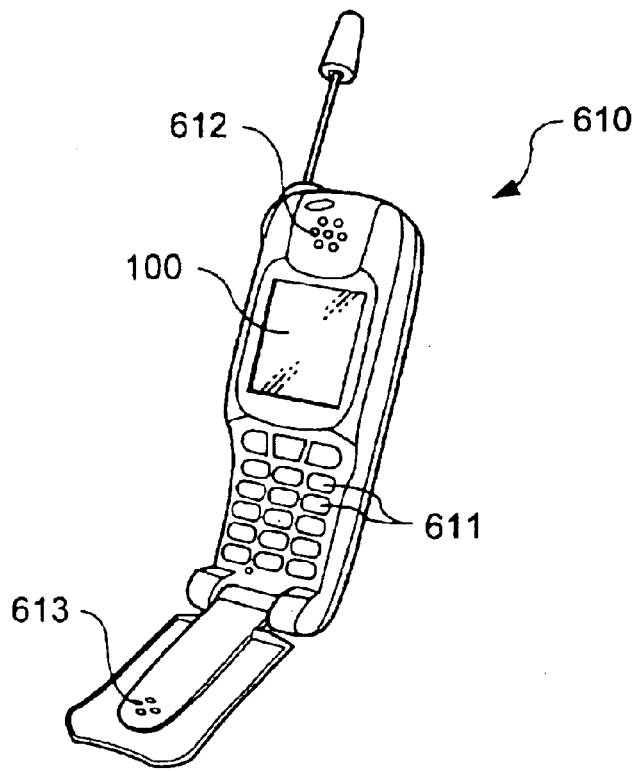
FIG. 21 is a perspective view showing configuration of a cellular telephone that is an example of the electronic equipment using the electro-optical device according to the present invention.

Now described is an example wherein a liquid crystal apparatus is applied to the display unit of a cellular telephone. FIG. 21 is a perspective view illustrating a configuration of the cellular telephone. In the drawing, a cellular telephone 610 is equipped with a plurality of control buttons 611, an ear piece 612, a mouthpiece 613, and a liquid crystal panel 100 shown in the above first to third embodiments.

Figure 22:
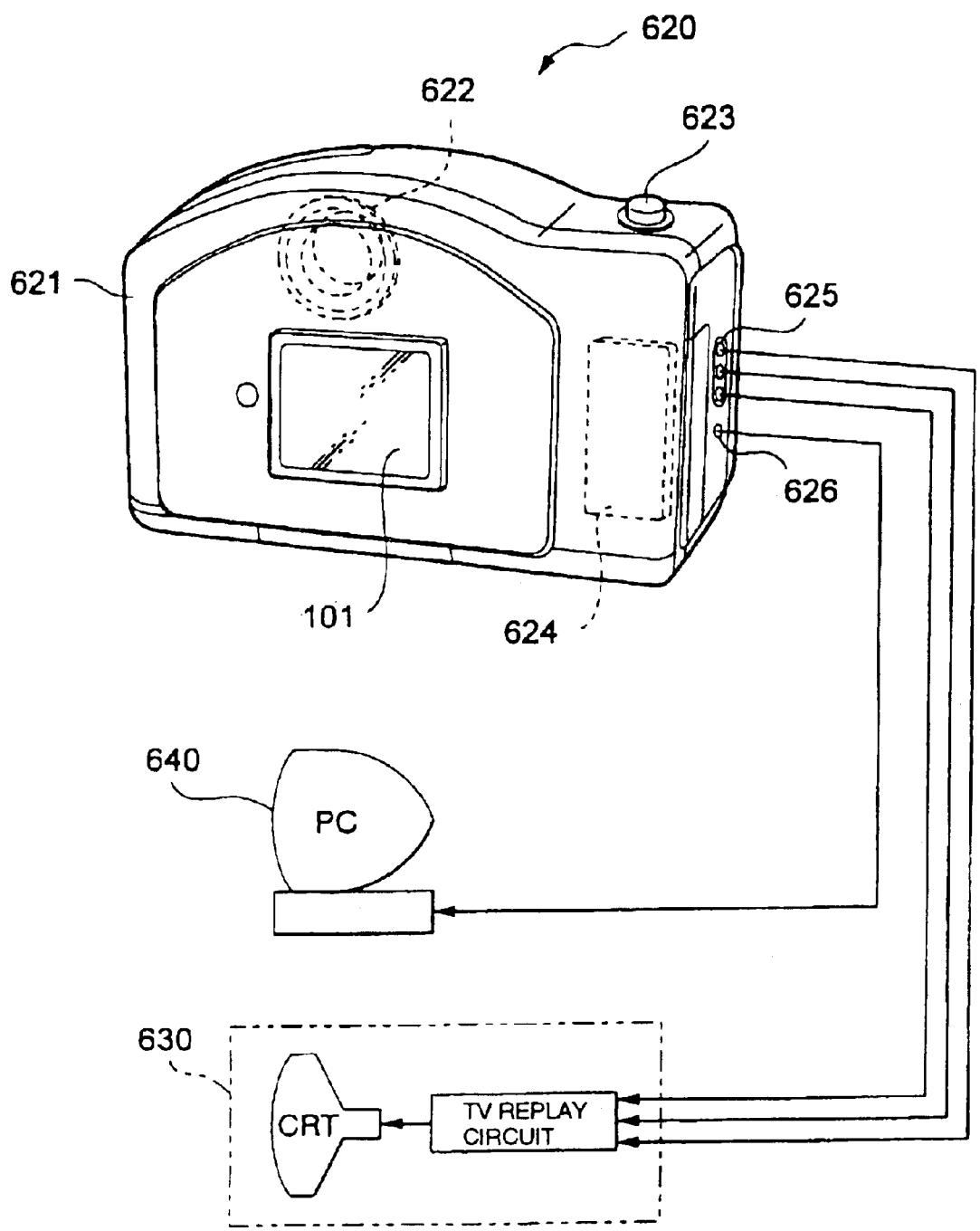
FIG. 22 is a perspective view showing configuration of the rear side of a digital still camera that is an example of the electronic equipment using the electro-optical device according to the present invention.

A digital still camera using a liquid crystal apparatus as its finder will now be described. FIG. 22 is a perspective view showing a configuration of the digital still camera. In the drawing, the mode of connection between the digital still camera and external equipment is shown in a simplified manner.

A regular camera is adapted to expose a film by an optical image of an object, while the digital still camera 620 photoelectrically transfers the optical image of the object by an imaging device, such as a CCD, to generate imaging signals. On the rear surface of a case 621 in the digital still camera 620, a liquid crystal panel 101 according to the foregoing second embodiment is provided to perform display based on the imaging signals by the CCD. Hence, the liquid crystal panel 101 functions as a finder for displaying an object. Furthermore, on the front surface of the case 621 (on the rear surface in the drawing), a light receiving unit 622 including an optical lens and CCD is provided.

When a photographer checks an object image displayed on the liquid crystal panel 101 and presses a shutter button 623, the imaging signal of the CCD at that point is transferred to and stored in a memory of a circuit board 624. In this digital still camera 620, a video signal output terminal 625 and a data communication input/output terminal 626 are provided on the side surface of the case 621. In addition, as shown in the drawing, a television monitor 630 is connected to the video signal output terminal 625, and a personal computer 640 is connected to the data communication input/output terminal 626, as necessary. When a predetermined operation is performed, the imaging signal stored in the memory of the circuit board 624 is output to the television monitor 630 or the personal computer 640.

Electronic equipment in which the electro-optical device according to the present invention can be used includes a liquid crystal television, a view-finder type or monitor direct-viewing type video tape recorder, a car navigation device, a pager, an electronic date book, an electronic calculator, a word processor, a workstation, a television telephone, a POS terminal, or a projector or the like employing the-electro-optical device in accordance with the present invention as its light valve, in addition to the personal computer shown in FIG. 20, the cellular telephone shown in FIG. 21, and the digital still camera shown in FIG. 22. As described above, the electro-optical device according to the present invention permits accurate inspection to be achieved even when the intervals among wires formed on a substrate are small. Therefore, it is possible to control the possibility of the electro-optical device incurring display failure in the electronic equipment that incorporates the electro-optical device.

As explained above, according to the present invention, accurate inspection can be performed even in the case that intervals among wires formed on a substrate are narrow.

What is claimed is:

1. An inspection method for an electro-optical device including a substrate having an electro-optical material disposed thereon and a plurality of wires having routing wire portions formed in a first region of the substrate other than a second region opposing the electro-optical material, wherein the routing wire portion of each of the wires has a first portion and a second portion, the second portion having a width smaller than that of the first portion, the inspection method comprising:

a step of bringing an inspection terminal into contact with the second portion of the routing wire portion in each of the wires;

a step of supplying a predetermined drive signal to the wires via the inspection terminal; and a step of determining whether the electro-optical device is good or bad on the basis of an image displayed based on the drive signal.

2. An inspection method for an electro-optical device according to claim 1, wherein individual wires are brought into contact with all of a plurality of inspection terminals together in the step of bringing the inspection terminals into contact with the routing wire portions.

3. An inspection method for an electro-optical device according to claim 1, wherein the inspection terminals are substantially shaped like flat plates and are abutted against the wires to flex the inspection terminals to cause the inspection terminals and the wires to be in surface contact with each other in the step of bringing the inspection terminals into contact with the routing wire portions.

4. An inspection method for an electro-optical device including a substrate having an electro-optical material disposed thereon and a plurality of wires having routing wire portions formed in a first region of the substrate other than a second region opposing the electro-optical material, wherein the routing wire portion of each of the wires has a first portion and a second portion, an interval of adjacent routing wire portions in the second portions is larger than an interval of the adjacent routing wire portions in the first portions, the inspection method comprising:

a step of bringing an inspection terminal into contact with the second portion of the routing wire portion in each of the wires;

a step of supplying a predetermined drive signal to the wires via the inspection terminal; and a step of determining whether the electro-optical device is good or bad on the basis of an image displayed based on the drive signal.

* * * * *